(12) United States Patent
Zhang et al.

(10) Patent No.: US 9,110,219 B1
(45) Date of Patent: Aug. 18, 2015

(54) ON-CHIP TWO-OCTAVE SUPERCONTINUUM GENERATION ENABLED BY ADVANCED CHROMATIC DISPERSION TAILORING IN SLOTTED WAVEGUIDES

(71) Applicant: University of Southern California, Los Angeles, CA (US)

(72) Inventors: Lin Zhang, Los Angeles, CA (US); Yan Yan, Los Angeles, CA (US); Yang Yue, Los Angeles, CA (US); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 310 days.

(21) Appl. No.: 13/740,137

(22) Filed: Jan. 11, 2013

Related U.S. Application Data

(60) Provisional application No. 61/585,462, filed on Jan. 11, 2012.

(51) Int. Cl.
*G02B 6/02* (2006.01)
*G02B 6/10* (2006.01)
*G01N 21/25* (2006.01)
*G01J 1/04* (2006.01)

(52) U.S. Cl.
CPC ........... *G02B 6/02214* (2013.01); *G01J 1/0425* (2013.01); *G02B 6/02052* (2013.01)

(58) Field of Classification Search
USPC .............................. 385/123, 130; 250/227.23
See application file for complete search history.

(56) References Cited

U.S. PATENT DOCUMENTS

2011/0206323 A1* 8/2011 Zhang et al. ................... 385/50

OTHER PUBLICATIONS

Afshar and Monro, "A full vectorial model for pulse propagation in emerging waveguides with subwavelength structures part I: Kerr nonlinearity," *Opt. Express*, 17:2298-2318, 2009.
Agrawal, "Chapter 10: Parametric Processes," *Nonlinear Fiber Optics*, $3^{rd}$ ed., 1989, 389-444.
Aközbek et al., "Third-harmonic generation and self-channeling in air using high-power femtosecond laser pulses," *Phys. Rev. Lett.*, 89(14):143901, 4 pages, 2002.
Alfano and Shapiro, "Emission in the region 4000 to 7000 Å via four-photon coupling in glass," *Phys. Rev. Lett.*, 24:584-588, Mar. 1970.

(Continued)

*Primary Examiner* — Jerry Blevins
(74) *Attorney, Agent, or Firm* — Fish & Richardson P.C.

(57) ABSTRACT

Devices and systems which include on-chip waveguides with flattened dispersion are described. In one aspect, silicon nitride slot waveguides that exhibit four zero-dispersion wavelengths with a flattened dispersion over a wavelength range of 500 nm are obtained. The disclosed silicon nitride slot waveguides are used to generate a two-octave supercontinuum from 630 nm to 2650 nm, enabling (a) on-chip generation of 5 fs optical pulses as short as 1.3 cycles, and (b) sensitive single-shot measurements of the absolute carrier-envelope phase using a single integrated waveguide. In another aspect, silicon slot waveguides that exhibits four zero-dispersion wavelengths with a flattened dispersion over a wavelength range of 670-nm are obtained. An octave-spanning supercontinuum is generated in the disclosed silicon slot waveguide, over a wavelength range from 1217 nm to 2451 nm, approximately from bandgap wavelength to half-bandgap wavelength. Input pulses longer that 100 fs can be compressed to 10 fs using the disclosed silicon slot waveguide.

17 Claims, 14 Drawing Sheets

(56) References Cited

OTHER PUBLICATIONS

Birks et al., "Supercontinuum generation in tapered fibers," *Opt. Lett.*, 25:1415-1417, 2000.
Bloembergen, "Nonlinear optics: Past, present, and future," *IEEE J. Sel. Top. Quantum Electron.*, 6:876-880, 2000.
Boyraz et al., "All optical switching and continuum generation in silicon waveguides," *Opt. Express*, 12:4094-4102, 2004.
Brabec and Krausz, "Intense few-cycle laser fields: Frontiers of nonlinear optics," *Rev. Mod. Phys.*, 72:545-591, 2000.
Bristow et al., "Two-photon absorption and Kerr coefficients of silicon for 850-2200 nm," *Appl. Phys. Lett.*, 90:191104, 3 pages, May 7, 2007.
Chang et al., "Optimization of supercontinuum generation in photonic crystal fibers for pulse compression," *Opt. Lett.*, 28:546-548, 2003.
Duchesne et al., "Supercontinuum generation in a high index doped silica glass spiral waveguide," *Opt. Express*, 18:923-930, 2010.
Dudley and Taylor, "Ten years of nonlinear optics in photonic crystal fibre," *Nature Photonics*, 3:85-90, 2009.
Dudley et al., "Supercontinuum generation in photonic crystal fiber," *Rev. Mod. Phys.*, 78:1135-1184, 2006.
Dulkeith et al., "Group index and group velocity dispersion in silicon-on-insulator photonic wires," *Opt. Express*, 14:3853-3863, 2006.
Eck, "Level crossings and anticrossings," *Physica*, 33(1):157-162, 1967.
Eggleton et al., "Chalcogenide photonics," *Nature Photon.*, 5:141-148, Feb. 28, 2011.
Ferrando et al., "Nearly zero ultraflattened dispersion in photonic crystal fibers," *Opt. Lett.*, 25:790-792, Jun. 2000.
François, "Nonlinear propagation of ultrashort pulses in optical fibers: Total field formulation in the frequency domain," *J. Opt. Soc. Am. B*, 8:276-293, 1991.
Frosz et al., "The role of the second zero-dispersion wavelength in generation of supercontinua and bright-bright soliton-pairs across the zero-dispersion wavelength," *Opt. Express*, 13(16):6181-6192, Aug. 8, 2005.
Fuji et al., "Monolithic carrier-envelope phase-stabilization scheme," *Opt. Lett.*, 30:332-334, 2005.
Gaeta, "Catastrophic collapse of ultrashort pulses," *Phys. Rev. Lett.*, 84:3582-3585, 2000.
Genty et al., "Nonlinear envelope equation modeling of sub-cycle dynamics and harmonic generation in nonlinear waveguides," *Opt. Express*, 15:5382-5387, 2007.
Halir et al., "Octave-spanning supercontinuum generation in CMOS-compatible silicon nitride waveguides," *Optical Society of America/ CLEO*, PDPA6, 2 pages, 2011.
Hartl et al., "Ultrahigh-resolution optical coherence tomography using continuum generation in an air-silica microstructure optical fiber," *Opt. Lett.*, 26:608-610, 2001.
Heidt, "Pulse preserving flat-top supercontinuum generation in all-normal dispersion photonic crystal fibers," *J. Opt. Soc. Am. B*, 27:550-559, 2010.
Hsieh et al., "Supercontinuum generation in silicon photonic wires," *Opt. Express*, 15:15242-15249, 2007.
Hu et al., "Dispersion-flattened polarization-maintaining photonic crystal fiber for nonlinear applications," *Opt. Commun.*, 282(20):4072-4076, Oct. 2009.
Hudson et al., "Octave spanning supercontinuum in an $As_2S_3$ taper using ultralow pump pulse energy," *Opt. Lett.*, 36:1122-1124, Apr. 1, 2011.
Ishikawa, *Ultrafast all-optical signal processing devices*, John Wiley & Sons, 2008 (Table of contents only).
Jones et al., "Carrier-envelope phase control of femtosecond mode-locked lasers and direct optical frequency synthesis," *Science*, 288:635-639, 2000.
Karalis et al., "Plasmonic-dielectric systems for high-order dispersionless slow or stopped subwavelength light," *Phys. Rev. Lett.*, 103:043906, 4 pages, Jul. 24, 2009.

Koonath et al., "Limiting nature of continuum generation in silicon," *Appl. Phys. Lett.*, 93:091114, 3 pages, 2008.
Koos et al., "Nonlinear silicon-on-insulator waveguides for all-optical signal processing," *Opt. Express*, 15:5976-5990, May 2007.
Kuyken et al., "Generation of a telecom-to-mid-infrared spanning supercontinuum using silicon-on-insulator wire waveguides," *Optical Society of America/ CLEO*, CTuS1, 2 pages, 2011.
Lamont et al., "Dispersion engineering of highly nonlinear As2S3 waveguides for parametric gain and wavelength conversion," *Opt. Express*, 15:9458-9463, 2007.
Lamont et al., "Supercontinuum generation in dispersion engineered highly nonlinear ($\gamma$=10 /W/m) As2S3 chalcogenide planar waveguide," *Opt. Express*, 16(19):14938-14944, 2008.
Langridge et al., "Cavity enhanced absorption spectroscopy of multiple trace gas species using a supercontinuum radiation source," *Opt. Express*, 16: 10178-10188, 2008.
Leuthold et al., "Nonlinear silicon photonics," *Nature Photonics*, 4:535-544, 2010.
Lin et al., "Dispersion of silicon nonlinearities in the near-infrared region," *Appl. Phys. Lett.*, 90:021111, 3 pages, 2007.
Lin et al., "Adiabatic self-tuning in a silicon microdisk optical resonator," *Opt. Express*, 16:14801-14811, 2008.
Lin et al., "Nonlinear optical phenomena in silicon waveguides: modeling and applications," *Opt. Express*, 15:16604-16644, 2007.
Linden et al., "XFROG—A new method for amplitude and phase characterization of weak ultrashort pulses," *Phys. Status Solidi B*, 206:119-124, 1998.
Liu et al., "Conformal dielectric overlayers for engineering dispersion and effective nonlinearity of silicon nanophotonic wires," *Opt. Lett.*, 33:2889-2891, 2008.
Mas et al., "Tailoring the dispersion behavior of silicon nanophotonic slot waveguides," *Opt. Express*, 18:20839-20844, 2010.
Mücke et al., "Determining the carrier-envelope offset frequency of 5-fs pulses with extreme nonlinear optics in ZnO," *Opt. Lett.*, 27(23):2127-2129, Dec. 2002.
Pelusi et al., "Photonic-chip-based radio-frequency spectrum analyser with terahertz bandwidth," *Nature Photonics*, 3:139-143, 2009.
Poletti et al., "Inverse design and fabrication tolerances of ultra-flattened dispersion holey fibers," *Opt. Express*, 13:3728-3736, 2005.
Qin et al., "Ultrabroadband supercontinuum generation from ultraviolet to 6.28 μm in a fluoride fiber," *Appl. Phys. Lett.*, 95:161103, 3 pages, 2009.
Ranka et al., "Visible continuum generation in air-silica microstructure optical fibers with anomalous dispersion at 800 nm," *Opt. Lett.*, 25:25-27, 2000.
Reeves et al., "Transformation and control of ultra-short pulses in dispersion-engineered photonic crystal fibers," *Nature*, 424:511-515, 2003.
Roppo et al., "Role of phase matching in pulsed second-harmonic generation: Walk-off and phase-locked twin pulses in negative-index media," *Phys. Rev. A*, 76:033829, 12 pages, 2007.
Saitoh and Koshiba, "Highly nonlinear dispersion-flattened photonic crystal fibers for supercontinuum generation in a telecommunication window," *Opt. Express*, 12:2027-2032, May 17, 2004.
Shi et al., "Chromatic confocal microscopy using supercontinuum light," *Opt. Express*, 12:2096-2101, 2004.
Skryabin and Gorbach, "Colloquium: Looking at a soliton through the prism of optical supercontinuum," *Rev. Mod. Phys.*, 82:1287-1299, 2010.
Stark et al., "Nonlinear wavelength conversion in photonic crystal fibers with three zero-dispersion points," *Phys. Rev. A*, 83:023808, 5 pages, 2011.
Sun et al., "Horizontal single and multiple slot waveguides: optical transmission at $\lambda$=1550 nm," *Opt. Express*, 15:17967-17972 , 2007.
Takara et al., "More than 1000 channel optical frequency chain generation from single supercontinuum source with 12.5GHz channel spacing," *Electron. Lett.*, 36:2089-2090, 2000.
Tan et al., "Group velocity dispersion and self phase modulation in silicon nitride waveguides," *Appl. Phys. Lett.*, 96:061101, 3 pages, 2010.
Tan et al., "Monolithic nonlinear pulse compressor on a silicon chip," *Nature Communications*, 1:116-121, 2010.

(56) References Cited

OTHER PUBLICATIONS

Tien et al., "Pulse compression and modelocking by using TPA in silicon waveguides," *Opt. Express*, 15:6500-6506, 2007.

Tse et al., "Supercontinuum generation at 1.06 µm in holey fibers with dispersion flattened profiles," *Opt. Express*, 14:4445-4451 (2006).

Turner et al., "Tailored anomalous group-velocity dispersion in silicon channel waveguides," *Opt. Express*, 14:4357-4362, 2006.

Xu et al., "Ultra-flattened chromatic dispersion control for circular photonic crystal fibers" *J. Opt. A: Pure and Applied Optics*, 13(5):055405, 7 pages, 2011.

Yin et al., "Soliton fission and supercontinuum generation in silicon waveguides," *Opt. Lett.*, 32:391-393, 2007.

Yin et al., "Dispersion tailoring and soliton propagation in silicon waveguides," *Opt. Lett.*, 31:1295-1297, 2006.

Yulin et al., "Four-wave mixing of linear waves and solitons in fibers with higher-order dispersion," *Opt. Lett.*, 29:2411-2413, Oct. 15, 2004.

Zhang et al., "Flattened dispersion in silicon slot waveguides," *Opt. Express*, 18(19):20529-20534, Sep. 2010.

Zhang et al., "A genetic algorithm based approach to fiber design for high coherence and large bandwidth supercontinuum generation," *Opt. Express*, 17:19311-19327, 2009.

Zhang et al., "Flat and low dispersion in highly nonlinear slot waveguides," *Opt. Express*, 18:13187-13193, 2010.

Zhang et al., "On-chip two-octave supercontinuum generation by enhancing self-steepening of optical pulses," *Opt. Express*, 19:11584-11590, 2011.

Zhang et al., "Silicon waveguide with four zero-dispersion wavelengths and its application in on-chip octave-spanning supercontinuum generation," *Opt. Express*, 20:1685-1690, 2012.

Zheng et al., "Dispersion characteristics of SOI-based slot optical waveguides," *Opt. Commun.*, 281:5151-5155, 2008.

\* cited by examiner

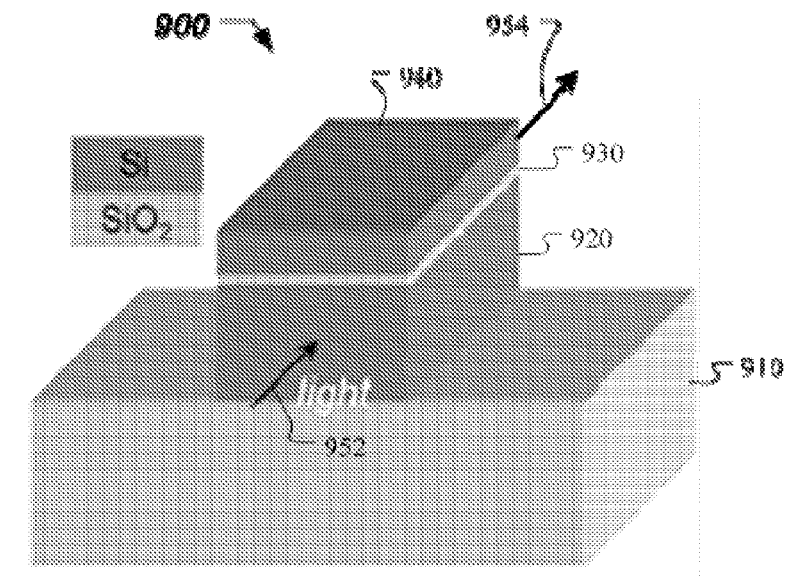
FIG. 9A
FIG. 9B    FIG. 9C
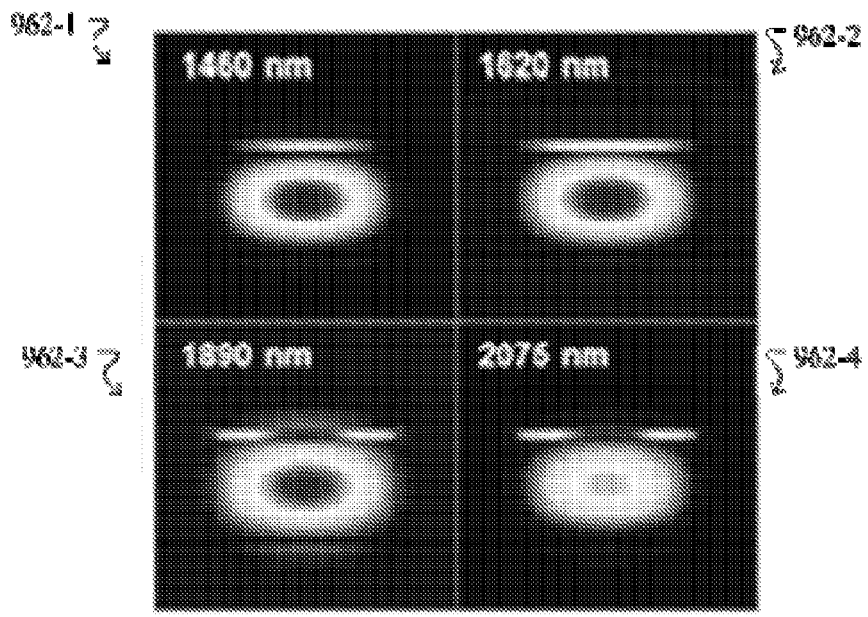
FIG. 9D    FIG. 9E

FIG. 13A
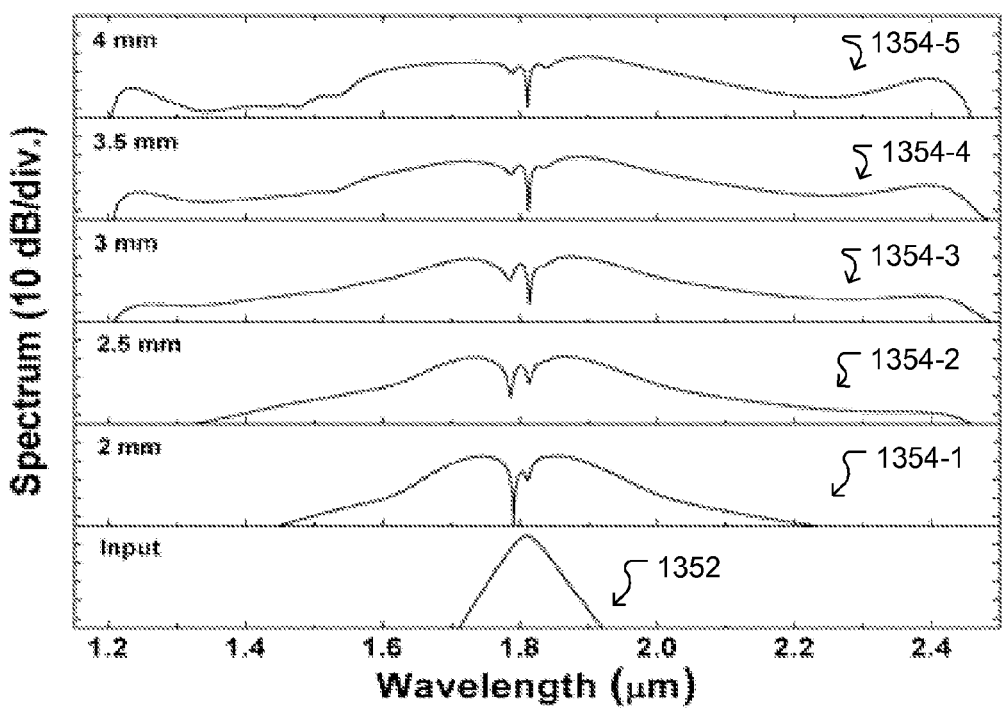
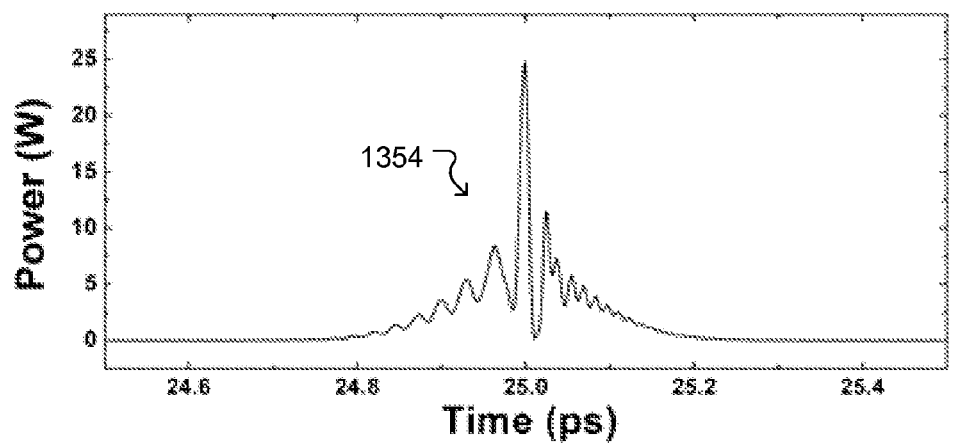
FIG. 13B

ON-CHIP TWO-OCTAVE SUPERCONTINUUM GENERATION ENABLED BY ADVANCED CHROMATIC DISPERSION TAILORING IN SLOTTED WAVEGUIDES

CROSS REFERENCE TO RELATED APPLICATIONS

This application claims the benefit of priority from U.S. Provisional Application Ser. No. 61/585,462, filed Jan. 11, 2012, the disclosure of which is incorporated by reference in its entirety.

BACKGROUND

This patent document relates in general to on-chip waveguides with flattened dispersion, and in particular to on-chip generation of an ultra-broad optical spectrum, called a supercontinuum, based on the flattened dispersion of the waveguides.

Generating a supercontinuum from a narrowband pulse is of particular interest in both fundamental science and engineering research of modern optics. Although recent years have witnessed dramatic advances in supercontinuum generation using photonic crystal fibers, it is quite challenging to obtain an octave-spanning supercontinuum on a chip, partially because of strong chromatic dispersion in high-index-contrast nonlinear integrated waveguides.

SUMMARY

Here we show by simulation that extremely flat and low dispersion, with four zero-dispersion wavelengths (ZDWs), can be achieved in silicon nitride slot waveguides over a wavelength bandwidth of 500 nm, which is 50 times better than present results. A two-octave supercontinuum is generated from 630 nm to 2650 nm, enabling on-chip ultra-wide-band applications, such as (a) generation of 5-fs optical pulses as short as 1.3 cycles and (b) sensitive single-shot measurements of the absolute carrier-envelope phase (CEP) based on a single integrated nonlinear element. In addition, silicon slot waveguides are described that exhibit four zero-dispersion wavelengths with a flattened dispersion obtained over a 670-nm bandwidth. Integrated waveguides with flattened dispersion hold a great potential for exploration of new nonlinear effects and achievement of ultra-broadband signal processing on a silicon chip. As an example, an octave-spanning supercontinuum is generated in silicon, over a wavelength range from 1217 to 2451 nm, almost from bandgap wavelength to half-bandgap wavelength. Input pulse is greatly compressed to 10 fs.

The field of nonlinear optics has enjoyed decades of exciting advancements [1, 2] in terms of both scientific exploration [3] and technological applications [4]. Core motivating advantages of employing nonlinear optics include ultra-wide-bandwidth operation and rich functionality of light manipulation. One basic building block in nonlinear optics is a supercontinuum generator, which was first reported by Alfano and Shapiro in 1970 [5]. Supercontinuum generation has experienced a revolutionary development after its realization using photonic crystal fibers (PCFs) [6-8]. Supercontinua of a few octaves in width have been demonstrated [9, 10], which are useful for numerous applications such as frequency metrology [11], optical coherence tomography [12], microscopy and spectroscopy [13], telecommunications [14], pulse compression [15], and sensing [16].

A key figure-of-merit is the wavelength range of a supercontinuum, which is influenced dramatically by the spectral profile of the chromatic dispersion in a nonlinear medium [7]. The success of PCF-based supercontinuum generation is partially attributed to advanced dispersion engineering allowed by design freedom of the two-dimensional lattice in the fiber cladding [2, 17]. Generally, the dispersion engineering for supercontinuum generation is aimed at desirable ZDWs and low dispersion over a wide wavelength range to enhance the nonlinear interactions of optical waves that are far apart in the frequency domain. Flat dispersion of ±2 ps/(nm·km) over a 1000-nm-wide wavelength range (one octave) has been reported [18, 19].

Highly nonlinear integrated waveguides and photonic wires with high index contrast have generated much excitement in recent years [20-21, 59-60], forming the backbone of compact devices in a photonic-integrated-circuit platform. However, conventional on-chip supercontinua have a spectral range of <400 nm [22-26], far less than one octave, which is partially because of insufficient capability to engineer the dispersion property of nonlinear integrated waveguides. Dispersion tailoring in these waveguides has been discussed [27-33], and there are a few physical factors that hinder the achievement of flat and low dispersion over a wide wavelength range. First, a high index contrast allows for sub-wavelength light confinement and produces a nonlinear coefficient a few orders of magnitude higher than that in silica optical fibers. However, this causes strong and highly wavelength-dependent dispersion. Second, for a fabrication-friendly design, on-chip waveguide structures have a limited numbers of dimensional parameters to be used in dispersion tailoring compared with PCFs.

A dispersion profile of a silicon waveguide was designed to be 20 times flatter by introducing a nano-scale slot structure [34], and to have three ZDWs, but this still cannot support more than one octave spectral broadening of fs-second optical pulses. A laudable goal would be to further flatten the dispersion and engineer it for on-chip ultra-wide-band nonlinear applications. Devices described in this specification include a silicon nitride slot waveguide, which exhibits improved dispersion flatness by 50 times, compared with the one described in reference [34], and four ZDWs. Further, described in this specification are advantages that a two-octave supercontinuum obtained on a chip can potentially bring. Some of these potential advantages include (i) wideband spectrum transferring enabled by pulse trapping, (ii) single-cycle optical pulse generation, as well as (iii) sensitive determination and stabilization of the timing offset between electric field oscillation and envelope of an optical pulse, also referred to as the carrier-envelope offset (CEO).

As noted above, chromatic dispersion is one of essential properties of an optical waveguide. It not only shapes the temporal waveform of an optical pulse traveling along the waveguide, but also affects pulse spectral broadening as pulse power is high enough to produce nonlinear effects [40]. In particular, zero-dispersion wavelengths (ZDWs) play a critical role in determining phase matching conditions and conversion efficiency in nonlinear parametric processes [40]. Silica step-index optical fibers usually exhibit one ZDW at near infrared wavelengths of interest, while photonic crystal fibers (PCFs) provide a great opportunity to tailor dispersion profile to produce three [51, 52] or four [53, 54] ZDWs and greatly move their locations. Such a spectral profile of the dispersion strongly influences nonlinear processes in fibers (e.g., supercontinuum generation) and enables generation of rich and unprecedented phenomena [17, 19, 55-58].

Although dispersion may not play a critical role in picosecond pulse propagation over an on-chip waveguide that is normally centimeter-long, flat and low dispersion over a wide wavelength range becomes desirable for femtosecond pulses or octave-spanning spectral broadening. Dispersion tailoring with two ZDWs in high-index-contrast waveguides was presented in references [30, 31, 61-62]. Dispersion tailoring assists octave-spanning supercontinuum generation in integrated chalcogenide and silicon nitride waveguides [63, 65], where index contrast is lower than in silicon waveguides and waveguide dispersion becomes smaller. Nevertheless, supercontinuum generation based on chalcogenide and some silicon nitride waveguides requires a high peak power of input femtosecond pulses, which is feasible only in a material platform with two-photon absorption (TPA) absent or extremely low. In a silicon waveguide, strong dispersion and considerable TPA make it quite challenging to achieve octave-spanning supercontinua [22-24, 66].

In this specification, a silicon slot waveguide that exhibits four ZDWs in a wavelength range from 1461 and 2074 nm is described. Dispersion values and ZDW locations can be varied, which provides a great opportunity to explore rich on-chip nonlinear effects such as solitons propagation, modulation instability, and supercontinuum and frequency comb generation. As an example, generation of an octave-spanning supercontinuum from 1217 nm to 2451 nm wavelength on a silicon chip is described, enabled by the four ZDW dispersion of the silicon slot waveguide disclosed in this specification. This octave-spanning supercontinuum allows for on-chip compression of an input pulse of more than 100 fs to 10 fs or less.

In general, one innovative aspect of the subject matter described in this specification can be embodied in devices that include a waveguide that includes (i) a $SiO_2$ substrate, (ii) a guiding layer including a guiding layer material having a guiding layer index of refraction larger than a $SiO_2$ index of refraction, where the guiding layer is disposed on the $SiO_2$ substrate, (iii) a cladding layer including the guiding layer material, and (iv) a SiO2 slot layer sandwiched between and in contact with the guiding and cladding layers. The guiding layer, the SiO2 slot layer and the cladding layer of the waveguide are configured such that a dispersion of the waveguide (a) is normal at shortest and longest wavelengths of a wavelength range, increases at the shortest wavelength, and decreases at the longest wavelength, (b) is convex from the shortest wavelength to a first wavelength of the wavelength range, (c) is concave from the first wavelength to a second wavelength of the wavelength range, and (d) is convex from the second wavelength to the longest wavelength of the wavelength range.

These and other implementations can include one or more of the following features. In some implementations, the dispersion of the waveguide can have two local maxima and a local minimum over the wavelength range, such that a wavelength corresponding to the local minimum is between respective wavelengths corresponding to the local maxima. For example, the dispersion of the waveguide has zero values at four wavelengths within the wavelength range. In some implementations, the guiding layer material is Si, the wavelength range is from 1435 nm to 2102 nm, and the dispersion of the waveguide varies between −22 to +20 ps/(nm*km) over the wavelength range. As another example, the guiding layer material is Si3N4, the wavelength range is from 1295 nm to 1803 nm, and the dispersion of the waveguide varies between −0.20 to +0.35 ps/(nm*km) over the wavelength range. A mode of light, which is guided through the waveguide, can transition from a strip mode to a slot mode as wavelength of the guided light increases within the wavelength range.

In some implementations, an average value of the dispersion of the waveguide can be negative, which corresponds to normal dispersion, when a thickness of the cladding layer exceeds a predetermined cladding layer thickness, and positive, which corresponds to anomalous dispersion, when the thickness of the cladding layer is less than the predetermined cladding layer thickness. In some implementations, an average value of the dispersion of the waveguide can be negative, which corresponds to normal dispersion, when a thickness of the guiding layer is less than a predetermined guiding layer thickness, and positive, which corresponds to anomalous dispersion, when the thickness of the guiding layer exceeds the predetermined guiding layer thickness. In some implementations, an average slope value of the dispersion of the waveguide can be negative when a thickness of the slot layer exceeds a predetermined slot layer thickness, and positive when the thickness of the slot layer is less than the predetermined slot layer thickness.

In some implementations, when a light pulse having a carrier wavelength and an input pulse width is guided through the waveguide over a propagation distance that exceeds a threshold propagation distance, the device can generate light having a continuous spectrum. In this case, the carrier wavelength of the light pulse is within or adjacent to the wavelength range, and a spectral range of the input light pulse corresponding to the input pulse width is narrower than the wavelength range and overlaps at least in part the wavelength range, such that the continuous spectrum of the generated light is larger than the wavelength range. For example, the guiding layer material is Si, and the dispersion of the waveguide varies between −22 to +20 ps/(nm*km) over the wavelength range from 1435 nm to 2102 nm, the carrier wavelength of the input light pulse is 1800 nm and the full-width-at-half-max of the input light pulse is 120 fs, the threshold propagation distance is between 3-4 mm, such that the continuous spectrum of the generated light spans from 1217 nm to 2451 nm, at −25 dB level. As another example, the guiding layer material is Si3N4, and the dispersion of the waveguide varies between −0.20 to +0.35 ps/(nm*km) over the wavelength range from 1295 nm to 1803 nm, the carrier wavelength of the input light pulse is 2200 nm and the full-width-at-half-max of the input light pulse is 120 fs, the threshold propagation distance is between 5-10 mm, such that the continuous spectrum of the generated light spans from 630 nm to 2650 nm, at −35 dB level.

In some implementations, the device can include a flat-top wide-band filter centered on a filter wavelength and having a filter spectral width, the filter wavelength and the filter spectral width configured to overlap the continuous spectrum of the generated light, such that the flat-top wide-band filter removes a long wavelength portion and a short wavelength portion from the continuous spectrum of the generated light to obtain filtered light. In this case, the device can output the filtered light as an output light pulse having an output carrier wavelength corresponding to the filter wavelength and an output pulse width corresponding to the filter spectral width, such that the output pulse width is shorter than the input pulse width by a ratio of the spectral range of the input pulse to the filter spectral width. For example, the threshold propagation distance is 5 mm, the input pulse width is 120 fs, and the output pulse width is 5 fs.

In some implementations, the device can include a beam splitter to split a fraction of the generated light having the continuous spectrum into first probe light and second probe light; a first narrow-band filter centered on a first filter wavelength to pass a first portion of the continuous spectrum of the first probe light at the first filter wavelength; a second narrow-band filter centered on a second filter wavelength to pass a second portion of the continuous spectrum of the second probe light at the second filter wavelength; a first photo-detector to measure a first power value of the first portion of the continuous spectrum of the first probe light at the first filter wavelength passed by the first narrow-band filter for a current value of an carrier-envelope offset (CEO) phase of the input pulse; a second photo-detector to measure a second power value of the second portion of the continuous spectrum of the second probe light at the second filter wavelength passed by the second narrow-band filter for the current value of the CEO phase of the input pulse; and a phase adjustor to controllably increment the CEO phase of the input pulse. Moreover, the device can be a system-on-chip (SoC). In this case, the SoC can include a processing device to estimate an absolute CEO phase of the input pulse based on multiple first and second power values measured for successive increments of the CEO phase of the input pulse.

In some implementations, the device can include a chip including telecommunications circuitry coupled with the waveguide.

In general, another innovative aspect of the subject matter described in this specification can be embodied as a device including a waveguide that includes (a) a guiding layer configured and arranged with respect to a substrate to guide light in a strip mode in accordance with a convex dispersion defined for the guiding layer, (b) a cladding layer, and (c) a slot layer arranged between and in contact with the cladding layer and the guiding layer. The slot layer and the cladding layer of the waveguide are configured and arranged with respect to the guiding layer and the substrate, including selection of an index contrast between the slot layer and substrate and the guiding and cladding layers, to (i) transition the light from the strip mode to a slot mode as a wavelength of the light increases within a range and (ii) induce an anti-crossing effect to cause a negative waveguide dispersion in balance with the convex dispersion for a portion of the range.

These and other implementations can include one or more of the following features. In some implementations, a material of the substrate and the slot layer is SiO2, and a material of the guiding layer and the cladding layer is Si3N4. In other implementations, a material of the substrate and the slot layer is SiO2, and a material of the guiding layer and the cladding layer is Si.

The details of one or more embodiments of the subject matter described in this specification are set forth in the accompanying drawings and the description below. Other features, aspects, and advantages of the subject matter will become apparent from the description, the drawings, and the claims.

DESCRIPTION OF THE FIGURES

FIGS. 9A-9E show aspects of another example of a device including a silicon slot waveguide.

FIGS. 13A-13B show aspects of another supercontinuum that can be generated using the device illustrated in FIG. 9A.

DETAILED DESCRIPTION

Figure 1A:
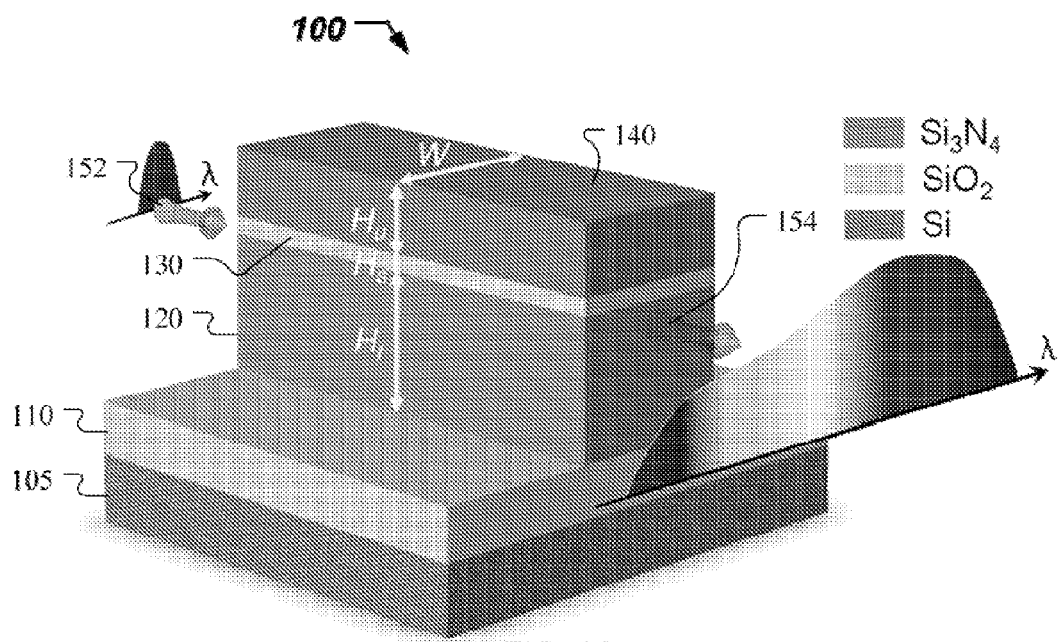
FIGS. 1A-1D show aspects of an example of a device including a silicon nitride slot waveguide.

In one aspect, on-chip dispersion flattening can be achieved using silicon nitride ($Si_3N_4$) slot waveguides. FIG. 1A shows an example of a device including a waveguide 100. The waveguide 100 includes a SiO2 substrate 110, a silicon nitride guiding layer 120 (having an index of refraction larger than a SiO2 index of refraction), where the guiding layer 120 is disposed on the SiO2 substrate 110. The waveguide 100 also includes a silicon nitride cladding layer 140, and a SiO2 slot layer 130 sandwiched between and in contact with the guiding layer 120 and the cladding layer 140. The substrate 110 is 2-μm-thick SiO2 on top of a silicon wafer, for instance.

Figures 1B, 1C, 1D:
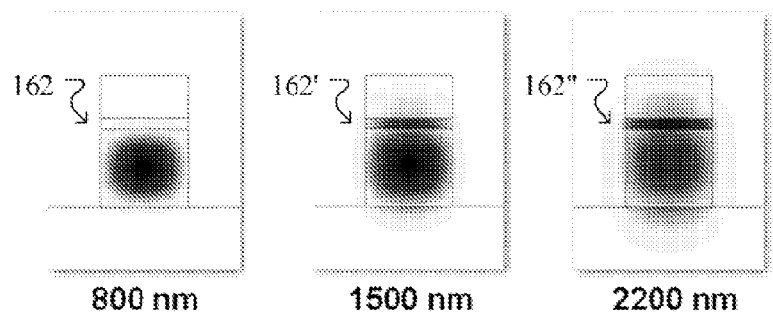

For example, the waveguide parameters are waveguide width W=1004 nm, upper height $H_u$=497 nm, lower height $H_l$=903 nm, and slot height $H_s$=124 nm. As another example, the waveguide parameters are waveguide width W=980 nm, upper height $H_u$=497 nm, lower height $H_l$=880 nm, and slot height $H_s$=120.5 nm. These configurations enable the waveguide 100 to confine light of a given spectral spread propagating through the waveguide as strip/slot modes at short/long wavelengths, respectively, of the given spectral spread. FIGS. 1B, 1C and 1D respectively show distributions of a fundamental mode 162, 162' and 162" of the guided light at 800 nm, 1500 nm, and 2200 nm wavelengths. In this example, the waveguide 100 has a single fundamental mode in the vertical polarization at a wavelength longer than 1800 nm. Moreover, a mode transition occurs from a strip-mode-like mode pattern 162 at 800 nm to a slot-mode-like mode pattern 162" at 2200 nm.

A pulse of light 152 can be input into the waveguide 100. The input light pulse 152 has a pulse duration (e.g., 100 fs) and a corresponding spectral spread. Once the light pulse propagates through the waveguide 100 for a distance longer than a threshold distance, a chromatic dispersion of the waveguide 100 causes a compression of the light pulse (e.g., to obtain an output light pulse 154 of 10 fs or less) and generation of a corresponding supercontinuum (spread over two octaves, for instance), as described below in connection with FIG. 3.

Figure 2A:
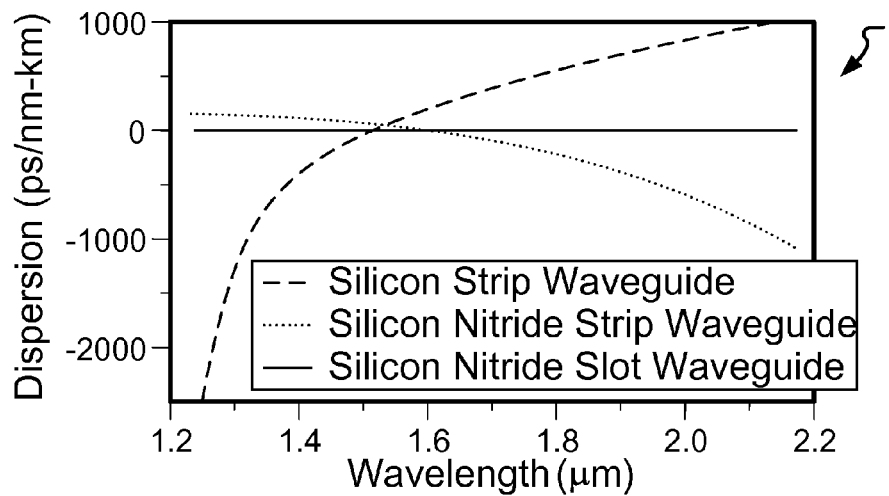
FIGS. 2A-2E show a wavelength dependence of dispersion corresponding to examples of waveguides that can be included in the device illustrated in FIG. 1A.

Such supercontinuum generation is made possible by a flat profile of the chromatic dispersion (referred simply as dispersion) of the waveguide 100. The waveguide dispersion is calculated as $D=-(c/\lambda)\cdot(d^2n_{eff}/d\lambda^2)$, where $n_{eff}$ is an effective index of refraction of the waveguide. FIG. 2A shows a graph 210 of the flat profile of the dispersion of the waveguide 100 compared to those of conventional Si (width: 840 nm; height: 750 nm) and $Si_3N_4$ (width: 1200 nm; height: 540 nm) strip waveguides. These sizes are chosen to produce a ZDW near 1550-nm wavelength. Material dispersions in silicon nitride and silica are taken into account in dispersion calculation. Algebra used for the dispersion calculation is described in detail in reference [34], which is incorporated by reference herein in its entirety. The waveguide 100 produces significantly flatter dispersion over a wide wavelength range than the strip waveguides.

Figure 2B:
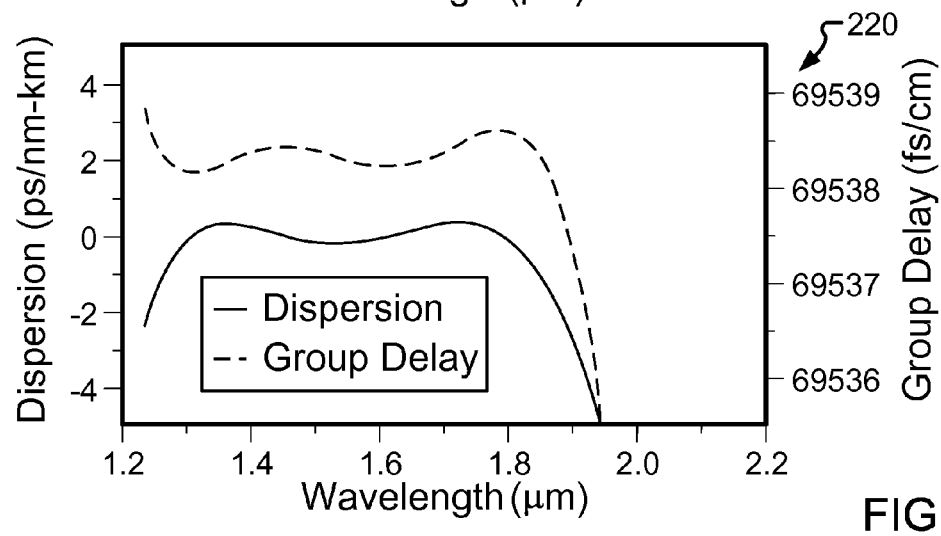

FIG. 2B shows a graph 220 that illustrates a close-up view of the dispersion curve shown in graph 210, together with group delay per unit length (fs/cm). Four ZDWs are located at 1308.5, 1449.6, 1610.1, and 1787.3 nm, respectively. Dispersion varies from −0.2 to +0.35 ps/(nm·km) over a 508-nm-wide bandwidth, from 1295 to 1803 nm. An extremely small group delay variation of −1 fs/cm is found between 1229-nm and 1872-nm wavelengths. In this manner, it is possible to control light on the attosecond scale using a millimeter-long waveguide. Dispersion flatness is defined as the max/min dispersion variation divided by bandwidth. The three waveguides in FIG. 2A have flatness values equal to 3.70, 0.07 and 0.0011 ps/(nm²·km), respectively, over the bandwidth from 1295 to 1803 nm. Compared to the dispersion-flattening silicon slot waveguide [34], which has dispersion flatness of 0.0579, the waveguide 100 described above in connection with FIG. 1A shows more than 50 times flatter dispersion.

In this case, the dispersion flattening results from an anti-crossing effect [34]. As a ubiquitous effect, anti-crossing is found in a variety of physical processes [35] and accompanied by the coupling of two interactive physical states. In the example of waveguide 100 shown in FIG. 1A, the mode transition from a strip mode to a slot mode occurs as the wavelength increases (as shown in FIGS. 1B, 1C and 1D), and the induced anti-crossing effect causes a slightly negative (and concave) waveguide dispersion [34], which is in balance with the convex dispersion in strip waveguides without a slot structure on the top. The negative dispersion can be determined by the index contrast between the slot and the surrounding materials. For example, the index contrast between silicon nitride and silica enables a match of the negative dispersion (caused by the induced anti-crossing effect) and the convex dispersion of a strip mode waveguide. The foregoing index contrast between silicon nitride and silica is one of the reasons for which a flatter dispersion can be obtained in the waveguide 100 relative to silicon/silica slot waveguides described in the reference [34].

In this manner, the $Si_3N_4$ guiding layer 120, the SiO2 slot layer 130 and the $Si_3N_4$ cladding layer 140 of the waveguide 100 are configured such that a dispersion of the waveguide 100 is normal at shortest and longest wavelengths of a wavelength range (e.g., 1.1-2.2 µm), and increases at the shortest wavelength, and decreases at the longest wavelength. Further, the dispersion is convex from the shortest wavelength to a first wavelength of the wavelength range, is concave from the first wavelength to a second wavelength of the wavelength range, and is convex from the second wavelength to the longest wavelength of the wavelength range.

Figure 2C:
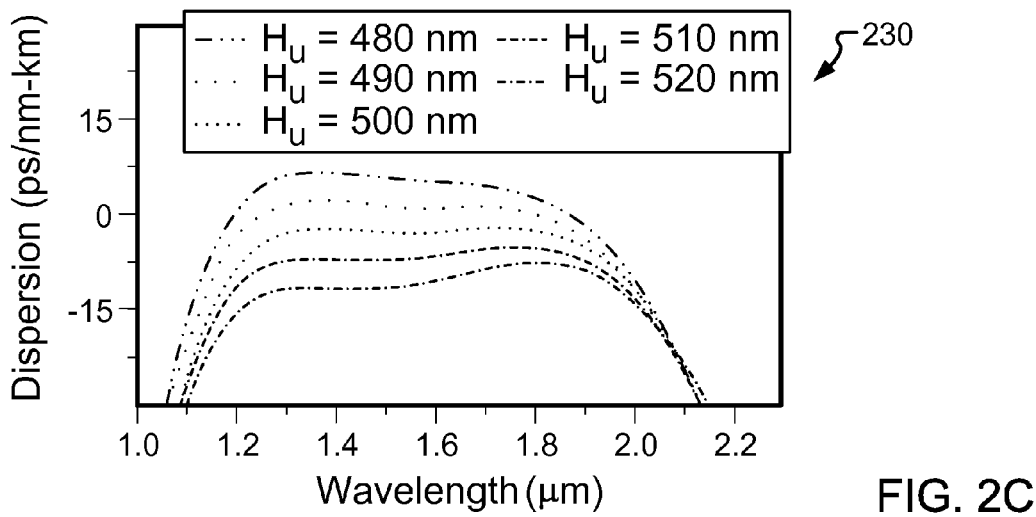

FIG. 2C shows a graph 230 that illustrates how an average value of the dispersion can be tailored by varying a thickness of the cladding layer 140 of the waveguide 100. For example, setting W=1000 nm, $H_s$=124 nm, and $H_f$=900 nm, the dispersion can change sign from anomalous to normal as $H_u$ increases from 480 to 520 nm, which enables generation of supercontinua in different dispersion regimes [7]. For instance, the dispersion can be in normal regime for cladding layer thicknesses larger than a predetermined cladding layer thickness or can be in anomalous regime for cladding layer thicknesses smaller than the predetermined cladding layer thickness. Here, the predetermined cladding layer thickness is 500 nm. It has been reported that the supercontinuum generated in all-normal dispersion regime typically exhibits good spectral coherence [7, 36], and here the slot waveguide can be modified to obtain normal dispersion at all wavelengths.

Figure 2D:
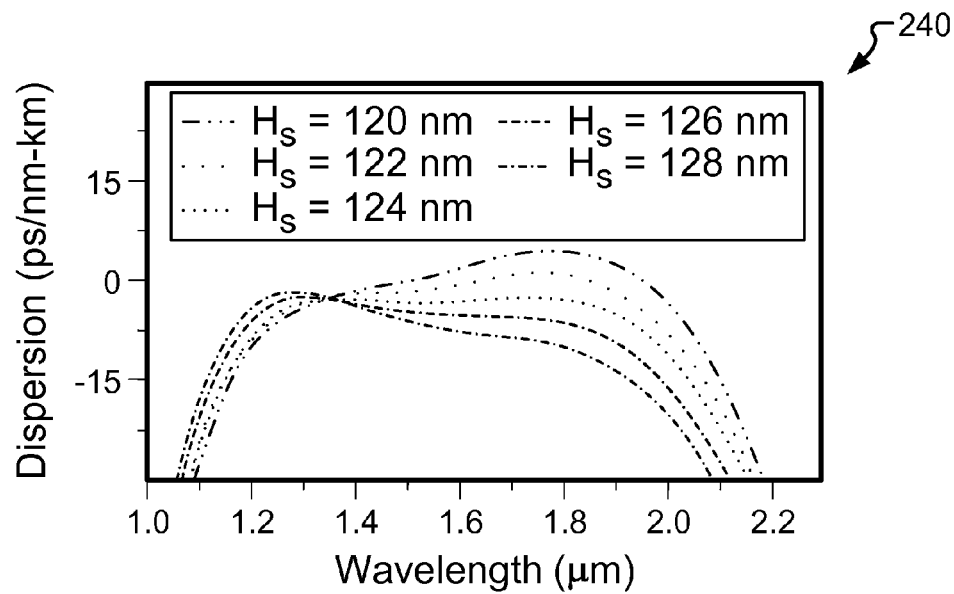

FIG. 2D shows a graph 240 that illustrates how an average slope value of the dispersion can be tailored by varying a thickness of the slot layer 130 of the waveguide 100. In this example, $H_u$ fixed at 500 nm and the other dimensions are unchanged from the example illustrated in FIG. 2B. The dispersion slope can be effectively made positive or negative by changing the slot size. For instance, the dispersion slope can be effectively made positive for slot layer thicknesses smaller than a predetermined slot layer thickness or negative for slot layer thicknesses larger than the predetermined slot layer thickness. Here, the predetermined slot layer thickness is 124 nm.

Figure 2E:
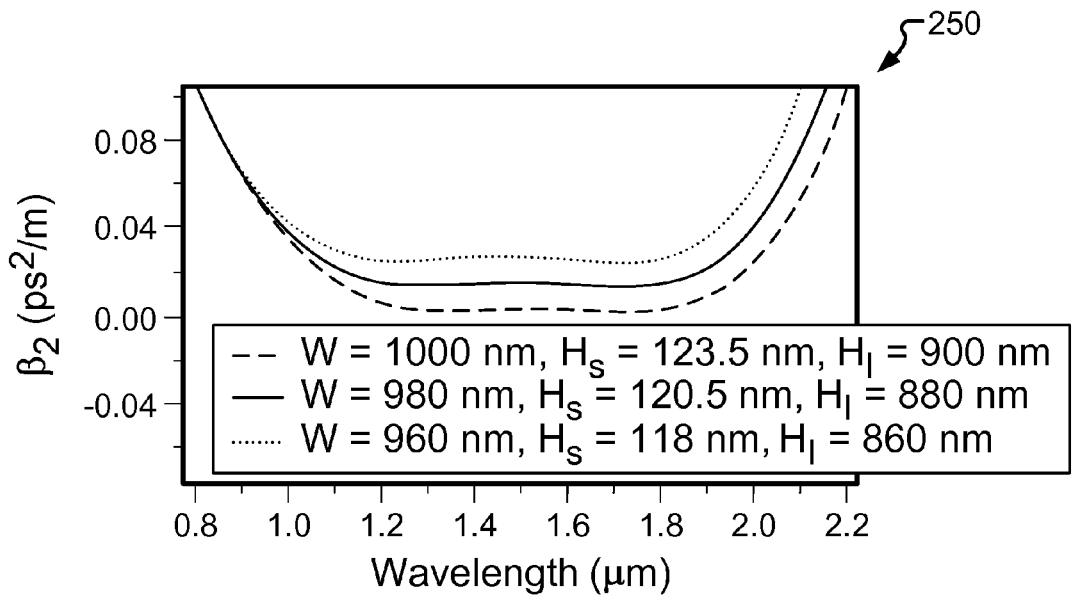

FIG. 2E shows a graph 250 that illustrates three flat dispersion profiles, in terms of dispersion coefficient $\beta_2$, of the waveguide 100 to be used below in this specification for supercontinuum generation in connection with FIG. 3. In the examples shown in graph 250, the average $\beta_2$ is 0.0031, 0.0141 and 0.0254 ps²/m for waveguide widths equal to 1000, 980, and 960 nm, respectively.

A generalized nonlinear envelope equation (GNEE) [37], with third harmonic generation considered, is used to model supercontinuum generation in the waveguide 100. It is confirmed that the simulation of even sub-cycle pulse propagations using this envelope equation is in excellent quantitative agreement with numerical integration of accurate Maxwell's equations [37]. Algebra used to model the supercontinuum generation is described in detail in reference [64], which is incorporated by reference herein in its entirety.

Figure 3:
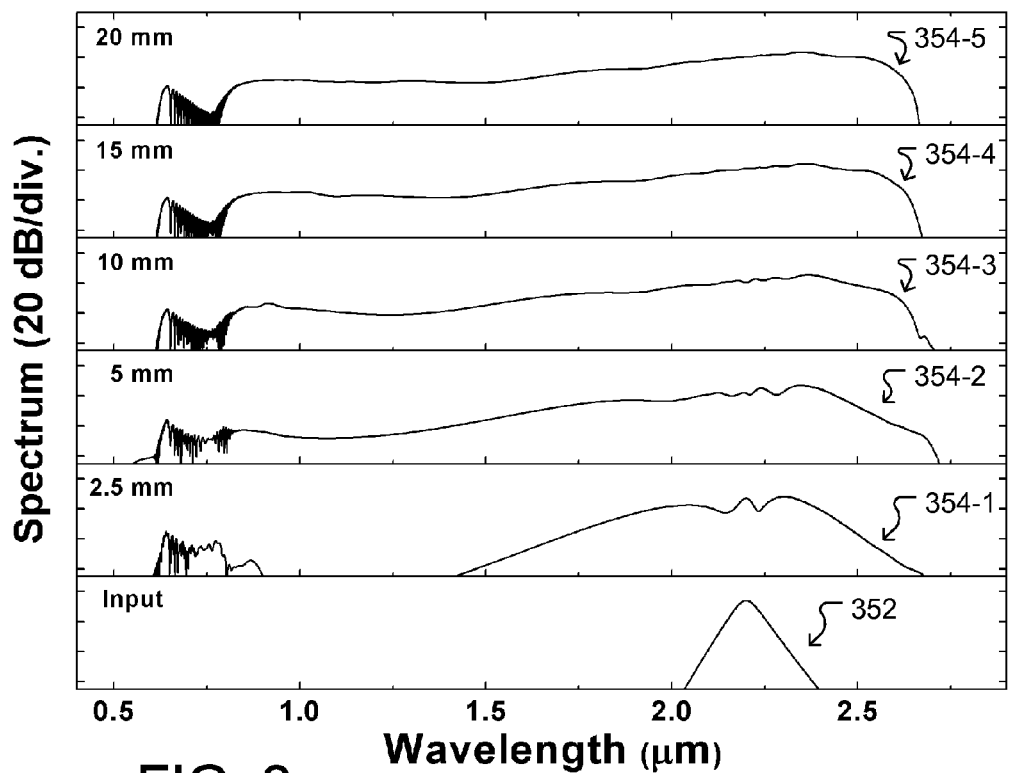
FIG. 3 shows aspects of a supercontinuum that can be generated using the device illustrated in FIG. 1A.

FIG. 3 shows two-octave supercontinuum generation in the waveguide 100 that is made possible by the flattened waveguide dispersion described above in connection with FIGS. 2A-2E. A chirp-free hyperbolic secant pulse 352 spectrally centered at 2200-nm wavelength, with a full width at half-maximum (FWHM) of 120 fs and a peak power of 6 kW (pulse energy of 0.8nJ), is launched into a 980 nm-wide $Si_3N_4$ slot waveguide that has the dispersion profile shown in FIG. 2E. Further, FIG. 3A shows instances of the supercontinuum corresponding to various pulse propagation distances along the waveguide 100: a first instance of the continuum 354-1 corresponds to a propagation distance of 2.5 mm; a second instance of the continuum 354-2 corresponds to a propagation distance of 5 mm; a third instance of the continuum 354-3 corresponds to a propagation distance of 10 mm; a fourth instance of the continuum 354-4 corresponds to a propagation distance of 15 mm; and a fifth instance of the continuum 354-5 corresponds to a propagation distance of 20 mm. The pulse 352 generates significantly blue-shifted spectral components down to 800 nm wavelength mainly due to self-steepening, which is, in principle, consistent with simulation results in low-dispersion bulk material [38] or fiber with dispersion ignored [39]. The significant spectral blue shift is mainly attributed to self-steepening of the pulse, when the dispersion is low over a wide wavelength range.

Figure 4:
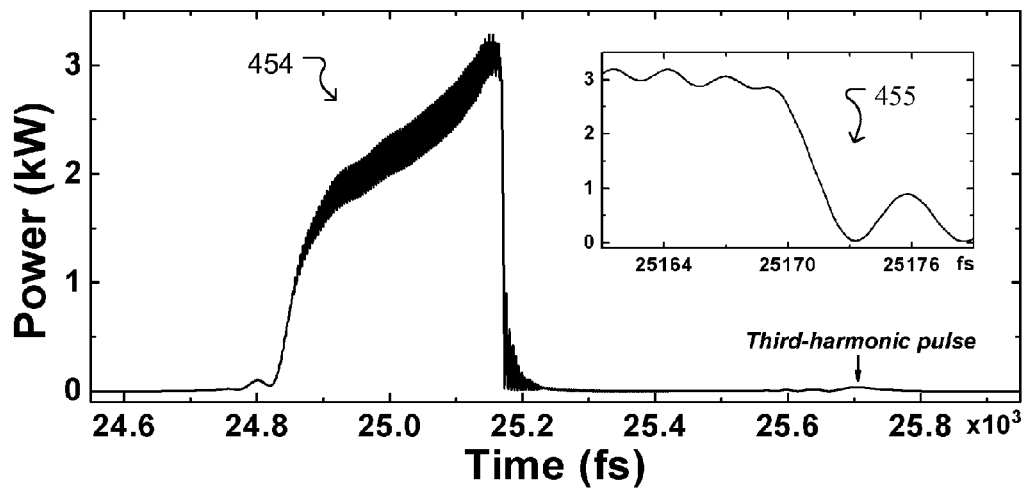
FIG. 4 shows temporal features of the supercontinuum illustrated in FIG. 3.

The flattened dispersion of the waveguide 100 (and described above in connection with FIGS. 2A-2E) reduces walk-off of newly generated spectral components. FIG. 4 shows a temporal profile of a contracted pulse 454 corresponding to the instance of the supercontinuum 354-2 after the pulse 352 propagates 5 mm through the waveguide 100.

At this propagation distance, the noted reduction in walk-off of the newly generated spectral components facilitates the formation of an optical shock 455 at the pulse falling edge that is as short as 3 fs. The optical shock 455 induces so much spectral blue shift that it reaches a short-wavelength region where third harmonics are generated. The blue part of the spectrum becomes stable for the instance of the supercontinuum 354-4 corresponding to a propagation distance of 15 mm. Moreover, the instance of the supercontinuum 354-5 corresponding to a propagation distance of 20 mm shows a small power fluctuation of 3 dB over a 754-nm-wide wavelength range from 847 to 1601 nm. The high-power part of the spectrum is red-shifted and extended to 2650 nm, due to self-phase modulation and Raman self-frequency shift [40]. In this manner, the supercontinuum is formed from 630 to 2650 nm at −35 dB, covering a two-octave bandwidth.

Figure 5:
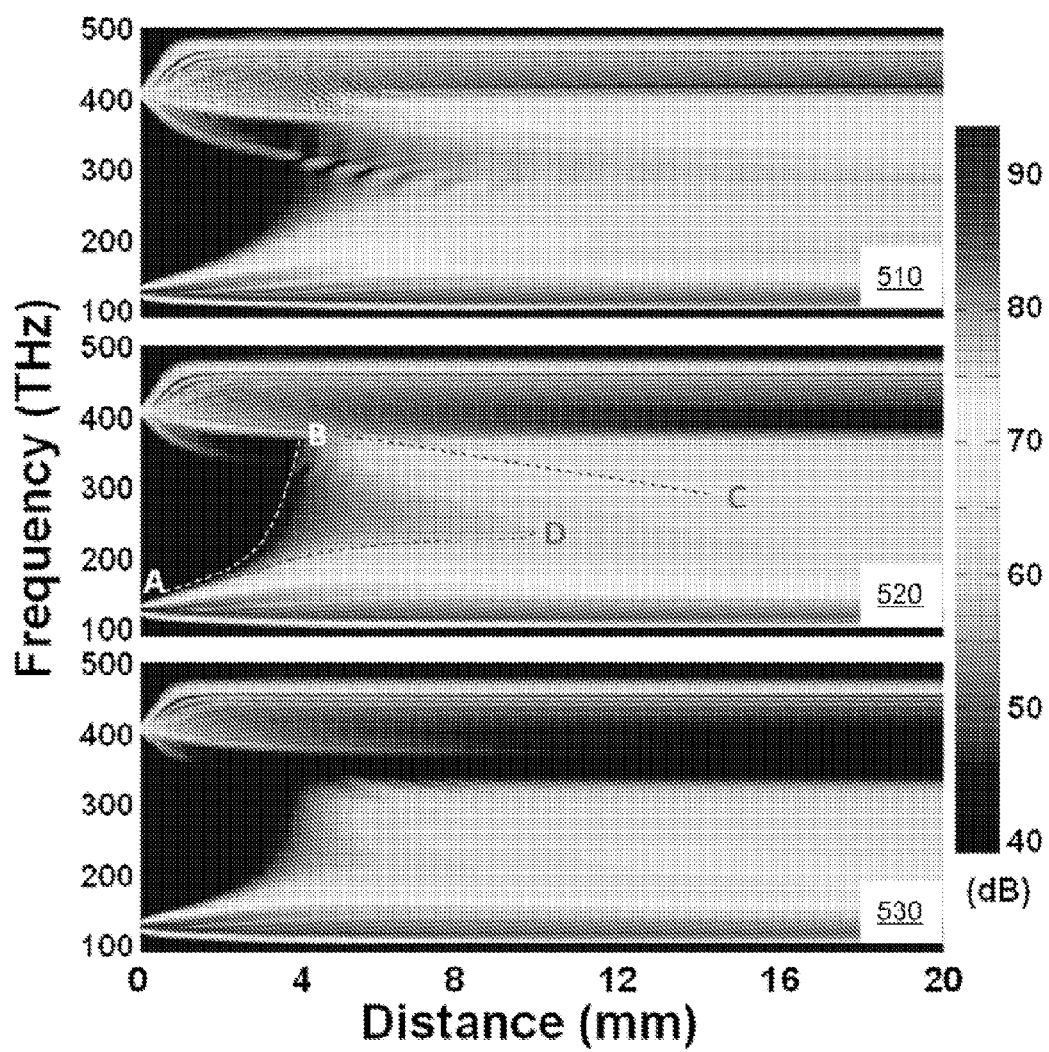
FIG. 5 shows spectral evolution of the supercontinuum illustrated in FIG. 3.

FIG. 5 shows spectral evolution along a length of the waveguide 100. Graph 510 corresponds to supercontinuum generation in a waveguide 100 that has a width of 1000 nm, a slot layer thickness of 123.5 nm, and a guiding layer thickness of 900 nm. In this case, the dispersion curve is close to zero, as shown in FIG. 2E. A steep pulse falling edge is formed, and the blue-shifted frequencies extend into the third harmonic spectrum. Interference can be clearly seen around 300 THz, which occurs between blue-shifted frequencies in the fundamental pulse and red-shifted frequencies in the third-harmonic pulse. Further, graph 520 corresponds to supercontinuum generation in a waveguide 100 that has a width of 980 nm, a slot layer thickness of 120.5 nm, and a guiding layer thickness of 880 nm. In this case, low dispersion causes a positive feedback mechanism for spectral broadening and optical shock formation, from A to B. Accumulated dispersion makes the pulse falling edge less steep and improves spectral flatness, from B to C. Self-phase modulation produces blue-shifted frequencies near the carrier frequency, from A to D. For this configuration of the waveguide 100, the blue shift by self-steepening goes so far away from the carrier frequency that there is a gap in the spectrum between the self-steepening-induced frequencies and the pulse-shoulder-induced frequencies. Furthermore, graph 530 corresponds to supercontinuum generation in a waveguide 100 that has a width of 960 nm, a slot layer thickness of 118 nm, and a guiding layer thickness of 860 nm. In this case, the dispersion is larger than the previous two cases, which causes more temporal spreading of the pulse and a less steep falling edge, and the self-steepening is not strong enough to produce a blue shift reaching the third harmonic spectrum.

A few nonlinear interactive processes responsible for the formation of the supercontinuum can be seen in graphs 510-530. First, self-steepening of the optical pulse, associated with intensity-dependent group velocity [40], causes a sharp falling edge of the pulse. On the other hand, self-phase modulation produces blue-shifted spectral components at the falling edge, which walk-off very little relative to the edge, due to the low dispersion. Together with the self-steepening effect, these high-frequency components in turn help form a shaper edge, resulting in bluer shifts. Therefore, the flat and low dispersion triggers this positive feedback mechanism for optical shock formation and spectral broadening, which follows from A to B as shown in graph 520. Such a steep pulse edge transfers energy to a frequency range near 370 THz, ~230 THz away from the pulse carrier frequency. Second, tracking from B to C in graph 520, we note that, with accumulated dispersion, the falling edge becomes less steep, and newly generated blue-shifted frequencies are closer to the carrier, which improves the spectral flatness of the supercontinuum.

Another effect of the dispersion is that the blue-shifted components walk away from the steep edge and overlap with the pulse tail, forming a beating pattern (or shock 455) as shown in FIG. 4. Third, the pulse waveform 454 has a high-power shoulder at the beginning of its falling edge before the optical shock 455, which generates blue-shifted frequencies near the carrier following from A to D in graph 520. Fourth, third-harmonic generation occurs at 408 THz, and some frequency-resolved fringes are observed mainly due to cross-phase modulation by the input pulse [40]. The third-harmonic pulse sees a larger group delay and escapes from the envelope of the input pulse. This is why the third-harmonic spectrum becomes stable after a propagation distance of ~1 mm.

It is noted that the results disclosed above in connection with FIGS. 3-5 hold when the waveguide 100 changes due to fabrication variations/imperfections.

Figure 6:
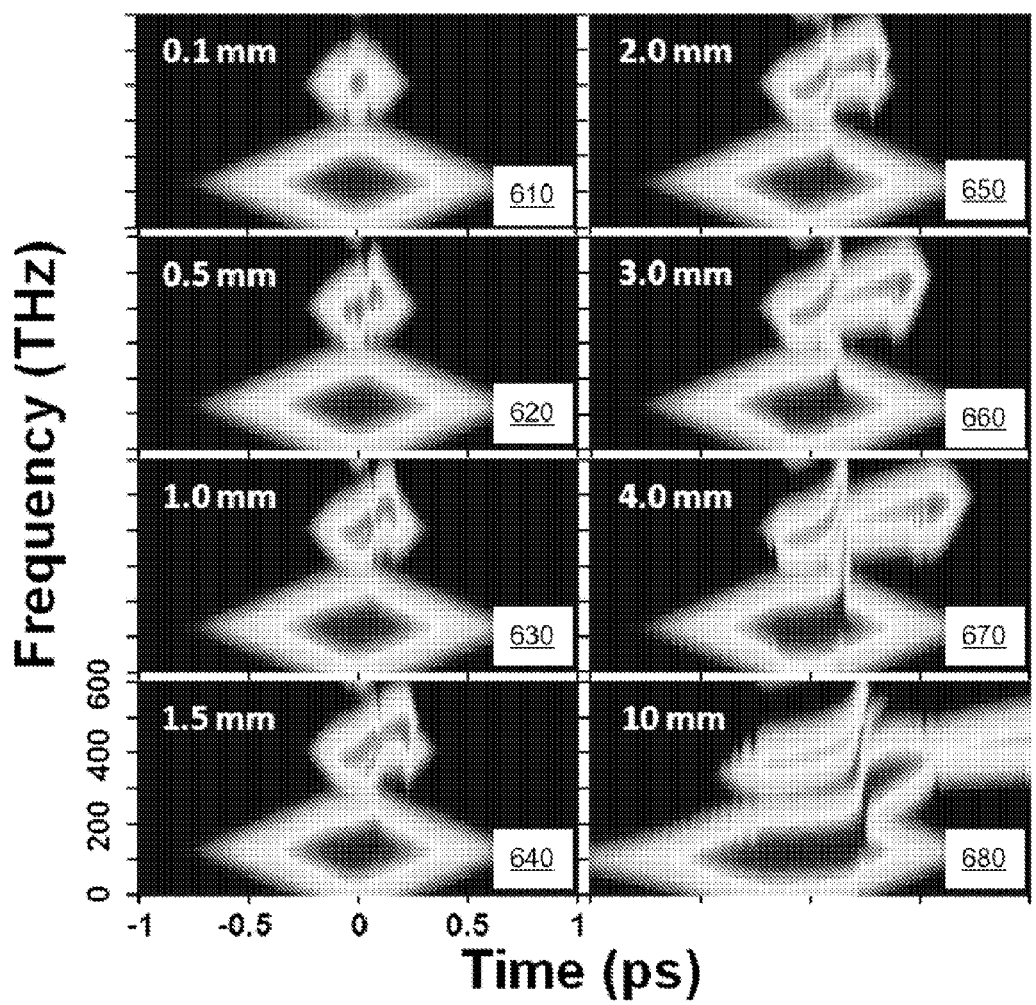
FIG. 6 shows spectrogram evolution of the supercontinuum illustrated in FIG. 3.

In addition, the dynamics of the self-steepening-induced supercontinuum generation, corresponding to graph 520, can be represented using spectrograms generated by a cross-correlation frequency-resolved optical gating (X-FROG) technique [41], in which an optical pulse is characterized simultaneously in time and frequency domains. FIG. 6 shows X-FROG spectrograms 610-680 corresponding to propagation of the input pulse 352 through the waveguide 100. Spectrogram 610 corresponds to a first instance of the light pulse after a 0.1 mm-propagation through the waveguide 100. Spectrogram 620 corresponds to a second instance of the light pulse after a 0.5 mm-propagation through the waveguide 100. Spectrogram 630 corresponds to a third instance of the light pulse after a 1.0 mm-propagation through the waveguide 100. Spectrogram 640 corresponds to a fourth instance of the light pulse after a 1.5 mm-propagation through the waveguide 100. Spectrogram 650 corresponds to a fifth instance of the light pulse after a 2.0 mm-propagation through the waveguide 100. Spectrogram 660 corresponds to a first instance of the light pulse after a 3.0 mm-propagation through the waveguide 100. Spectrogram 670 corresponds to a seventh instance of the light pulse after a 4.0 mm-propagation through the waveguide 100. Spectrogram 680 corresponds to an eight instance of the light pulse after a 10 mm-propagation through the waveguide 100. As described above, the light pulse (referred to as the fundamental pulse) experiences dramatic self-steepening and spectral broadening in its propagation from 0 to 4 mm (see, e.g., spectrograms 610-670). Due to frequency-dependent group delay, the blue part of the edge walks off relative to the light pulse by the time the light pulse traveled a distance of 10 mm in the waveguide 100, as shown in spectrogram 680 in which a hockey-stick-like pattern has formed. A third-harmonic pulse is trapped by the fundamental pulse due to a nonlinear phase locking mechanism and carries the dispersion property impressed by the fundamental pulse. Its spectrogram pattern is also hockey-stick-like, although stretched 3 times in the frequency domain. The phase-locked pulse trapping enables up-conversion of a 200-THz-wide supercontinuum, across a wide spectral region, where it is otherwise difficult to obtain flattened dispersion and efficient spectrum broadening by launching an optical pulse at a local frequency (corresponding to a material bandgap wavelength).

The third-harmonic pulse exhibits more complex dynamics, and its evolution is significantly affected by group delay and pulse trapping induced by third harmonic generation [42, 43]. As shown in FIG. 6, the third-harmonic pulse is generated and cross-phase modulated at the beginning of propagation (see, e.g., spectrogram 610). As shown in spectrograms 630-650, after propagation of 1 mm to 2 mm, the tail of the third-harmonic pulse, which is after the steep edge of the fundamental pulse, walks away quickly, since its frequency is not located in the dispersion-flattened spectral range. The rest part of the pulse that coincides with the peak of the fundamental pulse is split into two parts. First, the low-frequency part travels slowly, and after it arrives at the steep edge of the fundamental pulse, it is blue-shifted due to cross-phase modulation and then escapes from the envelope of the fundamental pulse. Second, the high-frequency part is trapped by the fundamental pulse due to a nonlinear phase locking mechanism [42] and carries the dispersion property impressed by the fundamental pulse [42, 43], which is why its pattern in the spectrogram 680 is also hockey-stick-like, although stretched 3 times in the frequency domain. As seen in FIG. 6, such phase-locked pulse trapping enables us to up-convert a 200-THz-wide supercontinuum that can be 2000 nm wide in wavelength, across a few-hundred-THz spectral region, to where a supercontinuum cannot be efficiently formed with an optical pulse at a local frequency, because, near material bandgap wavelength, dispersion flattening is hardly possible in practice.

Different from most of previously described supercontinua that were generated mainly due to either self-phase modulation in normal dispersion regime or high-order soliton fission and dispersion wave generation in anomalous dispersion regime [7], the disclosed supercontinuum features a highly asymmetric spectrum caused mainly by pulse self-steepening. Moreover, using the disclosed silicon nitride waveguide 100, one can obtain a high power output pulse 154 and extended spectral range that are difficult to obtain in conventional silicon waveguides, e.g., described in reference [34].

The greatly enhanced pulse self-steepening in the disclosed dispersion-flattened integrated waveguide 100 not only allows the formation of a supercontinuum (as described above in connection with FIGS. 3-6), but also opens opportunities for achieving functions that were not accessible previously on a chip. Those include single-cycle pulse generation and absolute carrier-envelope offset (CEO) phase monitoring.

Considering the apparatus complexity of few-cycle pulse sources, on-chip ultrashort pulse generation holds potential benefits in ultrafast optics, e.g., enabling design and fabrication of compact subsystems with significantly improved stability and cost-effectiveness. To date, short pulses generated on a chip have been in the picosecond range [44-46]. As described above in this specification in connection with FIG. 4, the falling edge of the pulse propagating along the low-dispersion waveguide 100 can be as short as 3 fs. Such a compressed light pulse contains most of spectral components in the ~2000-nm-wide continuum. Appropriately filtering out this portion of this spectrum can generate an ultrashort pulse.

Figure 7A:
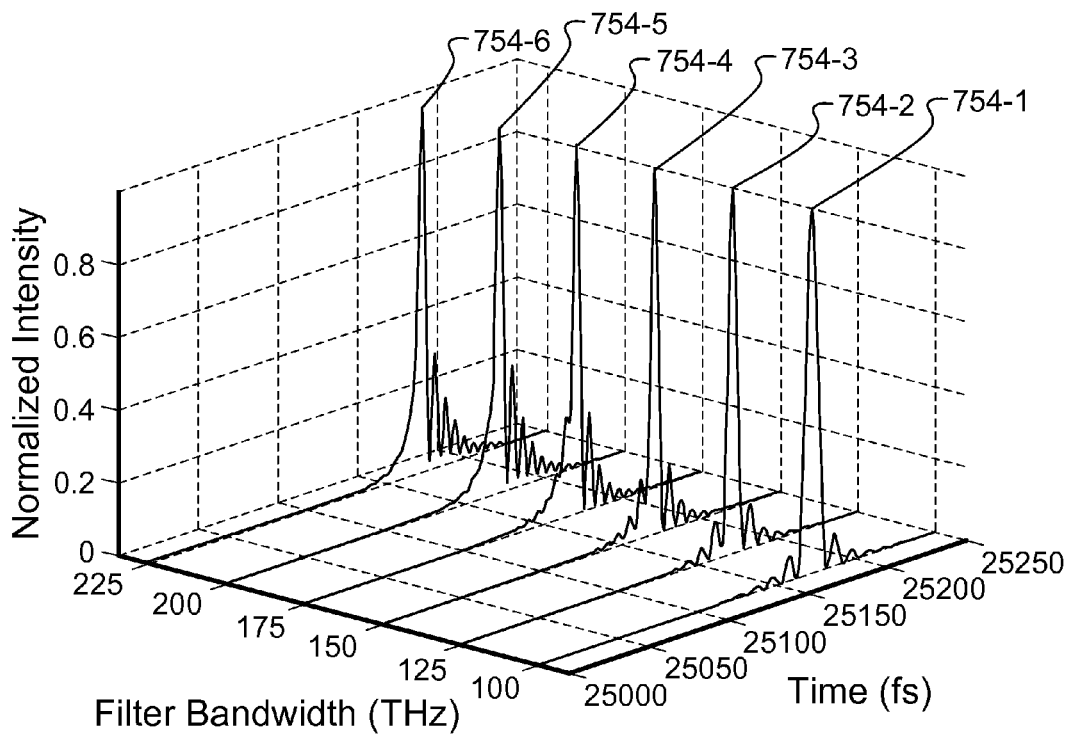
FIGS. 7A-7B show aspects of examples of single-cycle pulses that can be generated from the supercontinuum illustrated in FIG. 3.

In some implementations, an integrated device for generating ultrashort pulses (e.g., single-cycle pulses) can include the waveguide 100 and a flat-top wideband filter. The flat-top wide-band filter is centered on a filter wavelength and has a filter spectral width, where the filter wavelength and the filter spectral width are specified to overlap the continuous spectrum of the generated light (e.g., the instance of the supercontinuum 354-2 generated after an input light pulse 152 propagates 5 mm through the waveguide 100). In this manner, the flat-top wide-band filter removes a long wavelength portion and a short wavelength portion from the generated supercontinuum 354-2 to obtain filtered light For example, the flat-top wideband filter that is centered at 275 THz and has a 3-dB bandwidth of 173 THz and a 20-dB bandwidth of 184 THz. FIG. 7A shows an optical pulse 754-4 with a FWHM of 4.88 fs is extracted, in this case. This pulse duration corresponds to 1.3 cycles of the carrier wave at 275 THz. Using such a flat-top wideband filter, the third-harmonic part and high-power long-wavelength part of the supercontinuum are removed. There are temporal oscillations at the pulse tail, which originate from the beating pattern 455 in FIG. 4. The peak power of the generated pulse 754-4 is 1179.5 W, and the pulse energy is 11 pJ.

In this manner, the integrated device outputs the filtered light as an output light pulse having an output carrier wavelength corresponding to the filter wavelength and an output pulse width corresponding to the filter spectral width, such that the output pulse width is shorter than the input pulse width by a ratio of the spectral range of the input pulse to the filter spectral width. FIG. 7A also shows optical pulses output by the integrated device that includes the waveguide 100 and the flat-top wideband filter with bandwidth BW, for different filter bandwidths. A first output pulse 754-1 corresponds to a bandwidth of the flat-top wideband filter of 98 THz; a second output pulse 754-2 corresponds to a bandwidth of the flat-top wideband filter of 125 THz; a third output pulse 754-3 corresponds to a bandwidth of the flat-top wideband filter of 150 THz; a fifth output pulse 754-5 corresponds to a bandwidth of the flat-top wideband filter of 200 THz; and a sixth output pulse 754-6 corresponds to a bandwidth of the flat-top wideband filter of 225 THz. The pulse pedestal becomes lower as the filter bandwidth is reduced from 173 THz to 98 THz.

Figure 7B:
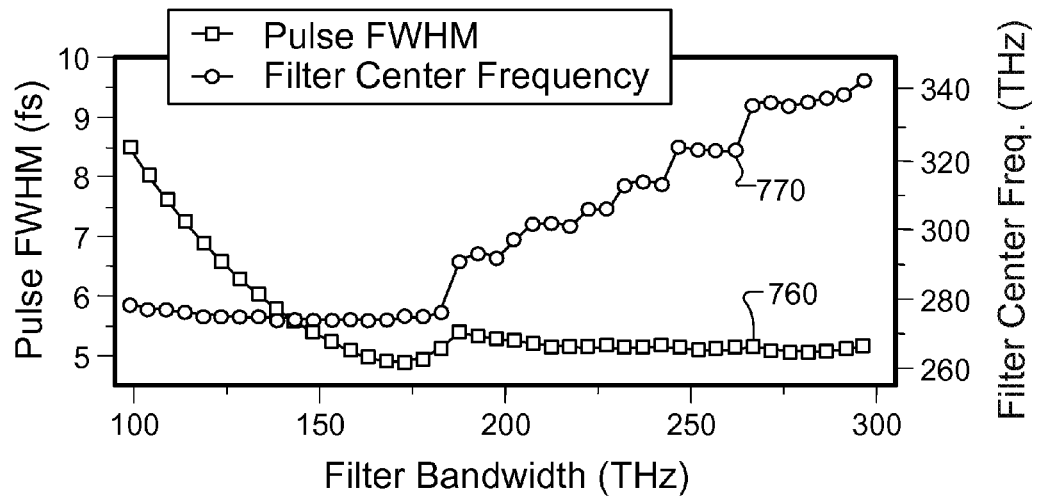

FIG. 7B shows that a pulsewidth 760 changes with filter bandwidth, with an optimal filter center frequency 770. There are two trends seen in the pulsewidth 760 evolution. First, with a filter bandwidth below 180 THz, reducing the bandwidth causes a rapid change in pulsewidth 760, but the optimal center frequency 770 is almost fixed. Second, when the filter bandwidth goes beyond 180 THz, the pulsewidth 760 can be kept small, while the optimal center frequency 770 needs to be increased. In this process, the red edge of the filter remains at ~190 THz, which chops the pulse rising edge sharply. On the other hand, the blue edge of the filter touches the third-harmonic spectrum that features a beating pattern 455 with packets of oscillations, as shown in FIG. 4. The blue edge needs to cover a whole packet to help shape a narrow pulse waveform in the time domain, which produces a step-like increase of the optimal filter center frequency 770 in FIG. 7B.

Figure 8A:
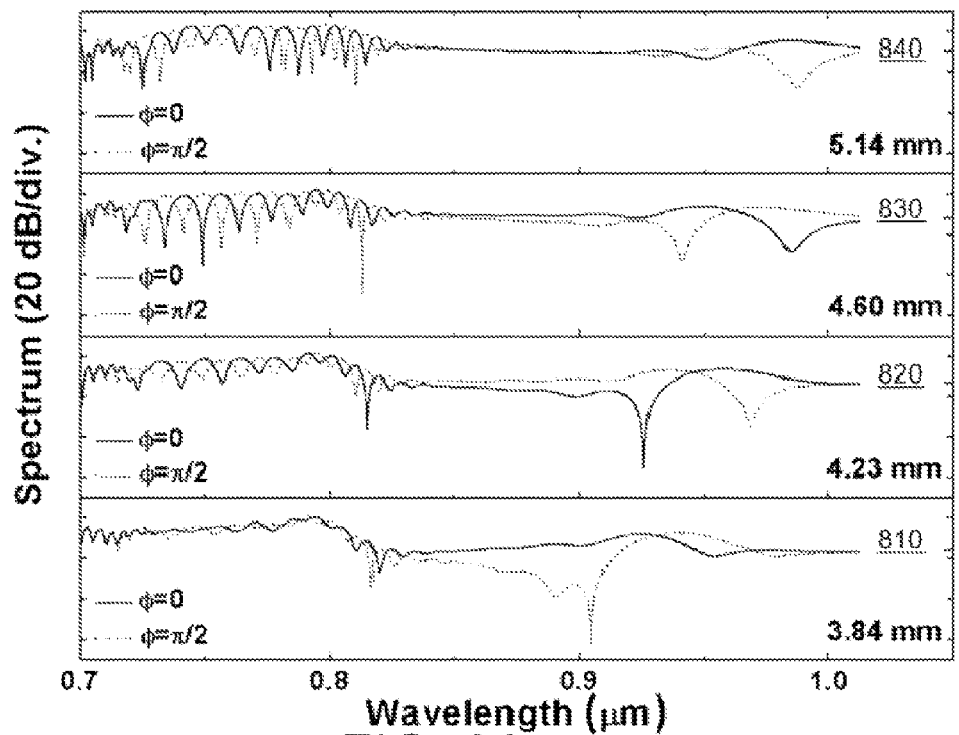
FIGS. 8A-8B show aspects of phase measurements for the supercontinuum illustrated in FIG. 3.

Additionally, on-chip measurements of the absolute carrier-envelope offset (CEO) phase of a femtosecond pulse can be performed using an integrated device that includes the waveguide 100. The CEO phase of a pulse source device can drift over time and, hence, can affect system performance [11]. As described above in reference to graph 410, the large spectral blue-shift interferes with the third-harmonics red-shifted by cross-phase modulation, which creates the spectral interference fringes around 340 THz at a propagation distance of ~4 mm. This interference is accompanied by a strong CEO effect. FIG. 8A shows spectrum instances 810, 820, 830 and 840 corresponding to propagation distances 3.84, 4.23, 4.60, and 5.14 mm. Each of the spectrum instances is shown for a CEO phase equal to 0 and $\pi/2$. Note that the power fluctuates by >20 dB at certain wavelengths for these CEO phase values. For the instance of the supercontinuum 820 corresponding to a propagation distance of 4.23 mm, wavelengths at which the power fluctuates as function of CEO phase are $\lambda 1=0.925$ μm and $\lambda 2=0.961$ μm.

Accordingly, the CEO phase of such a pulse source needs to be carefully monitored and stabilized. Typically, an individual subsystem with high complexity is fabricated and used to measure the absolute CEO phase of the pulse source. Moreover, a portable and integrated device to monitor and stabilize the absolute phase of few-cycle optical pulses [47, 48] is desired in the marketplace.

The disclosed technologies can be used to design an integrated device for measuring the CEO phase. The integrated device includes the waveguide 100, a beam splitter, two narrow-band filters, and two photodetectors. The beam splitter can split a fraction of the generated light 154 having the continuous spectrum (e.g., 820) into first probe light and second probe light. A first narrow-band filter centered on a first filter wavelength (e.g., corresponding to 312 THz) passes a first portion of the continuous spectrum of the first probe light at the first filter wavelength, and a second narrow-band filter centered on a second filter wavelength (e.g., corresponding to 319 THz) passes a second portion of the continuous spectrum of the second probe light at the second filter wavelength. For instance, at a propagation distance of 4.6 mm, a tap can extract a portion of the generated supercontinuum 810. Gaussian filters, with a FWHM of 3 THz, one at 312 THz (λ2 ~961 nm) and the second one at 319 THz (λ1 ~925 nm) can be used to extract the significant local power change that reflects the absolute phase. The power extracted by the two filters is measured by the two photodetectors, respectively. The first photodetector measures a first power value of the first portion of the continuous spectrum 820 of the first probe light at the first filter wavelength λ1 passed by the first narrow-band filter for a current value of a CEO phase, and the second photodetector measures a second power value of the second portion of the continuous spectrum 820 of the second probe light at the second filter wavelength λ2 passed by the second narrow-band filter for the current value of the CEO phase.

Figure 8B:
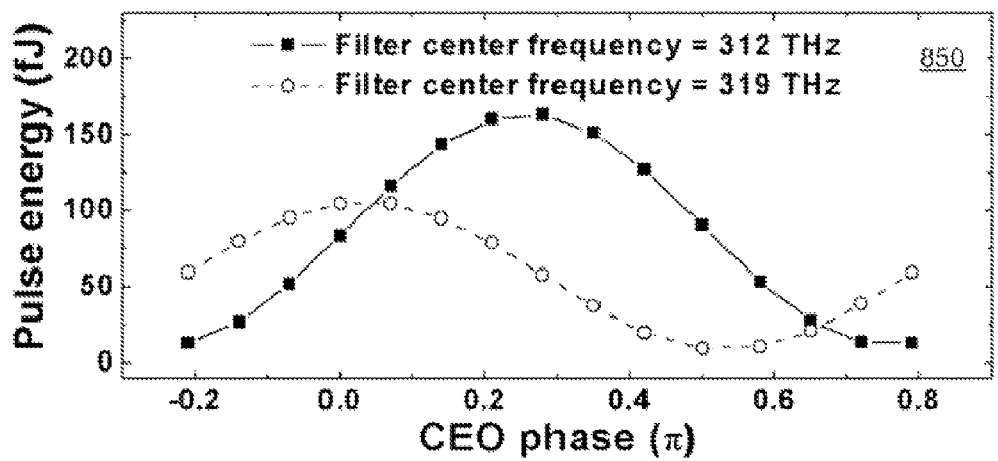

A phase adjustor can be included in the integrated device to controllably increment the phase of the envelope of the input pulse. In this manner, a processing device can estimate an absolute CEO phase corresponding to the generated light having the continuous spectrum 820 based on multiple first and second power values measured for successive increments of the CEO phase. In some implementations, the processing device can be part of the integrated device, for example, when the integrated device is a system-on-chip (SoC.) FIG. 8B shows results 850 of first power of light transmitted by a filter centered at 319 THz and second power of light transmitted by another filter centered at 312 THz. The results 850 show sine-like and cosine-like pulse energy changes, and can be used to determine the absolute CEO phase and its sign. Accordingly, the extracted pulse power varies from 0.7 to 13 µW, which is detectable in practice [11]. Note that the maximum and minimum values of the filtered energy do not exactly correspond to the CEO phases of 0 and π/2, because of a nonlinearly induced phase shift. This on-chip approach is applicable to a pulsewidth ranging from a few fs to >100 fs, requiring a small fraction of pulse energy (<1 nJ) tapped.

As noted above in this specification, a flattened dispersion with four ZDWs can also be obtained in silicon slot waveguides. Conventional Si slot waveguides have a vertical slot, and as such, a width of the slot is limited by lithography. Defects cause by the lithography can increase scattering loss on sidewalls of the slot. The Si slot waveguides described in this specification have a horizontal slot because it allows a better control to fabricate a thin slot layer. FIG. 9A shows an example of a device including a waveguide 900. The waveguide 900 includes a SiO2 substrate 910, a silicon guiding layer 920 (having an index of refraction larger than a SiO2 index of refraction), where the silicon guiding layer 920 is disposed on the SiO2 substrate 910. The waveguide 900 also includes a silicon cladding layer 940, and a SiO2 slot layer 930 sandwiched between and in contact with the silicon guiding layer 920 and the silicon cladding layer 940. The substrate 910 is 2-µm-thick SiO2 on top of a silicon wafer, for instance. For example, the SiO2 can be buried oxide.

For example, the waveguide parameters are width W=610 nm, upper height (or cladding layer thickness) Hu=136 nm, lower height (or guiding layer thickness) Hl=344 nm, and slot height (or slot layer thickness) Hs=40 nm. These configurations enable the waveguide 900 to confine light of a given spectral spread propagating through the waveguide 900 as strip/slot modes at short/long wavelengths, respectively, of the given spectral spread. FIGS. 9B, 9C, 9D and 9D respectively show distributions of a fundamental mode 962-1, 962-2, 962-3 and 962-4 of the guided light at 1460 nm, 1620 nm, 1890 nm and 2076 nm, corresponding to the near the ZDWs. In this example, a mode transition occurs from a strip-mode-like mode pattern 962-1 at 1460 nm to a slot-mode-like mode pattern 962-4 at 2076 nm.

A pulse of light 952 can be input into the waveguide 900. The input light pulse 952 has a pulse duration (e.g., ~100 fs) and a corresponding spectral spread. Once the light pulse propagates through the waveguide 900 for a distance longer than a threshold distance, a chromatic dispersion of the waveguide 900 causes a compression of the light pulse (e.g., to obtain an output light pulse 954 of 10 fs or less) and generation of a corresponding supercontinuum (spread from 1217 to 2451 nm, for instance), as described below in connection with FIGS. 13A-13B and 14A-14B.

Figure 10B:
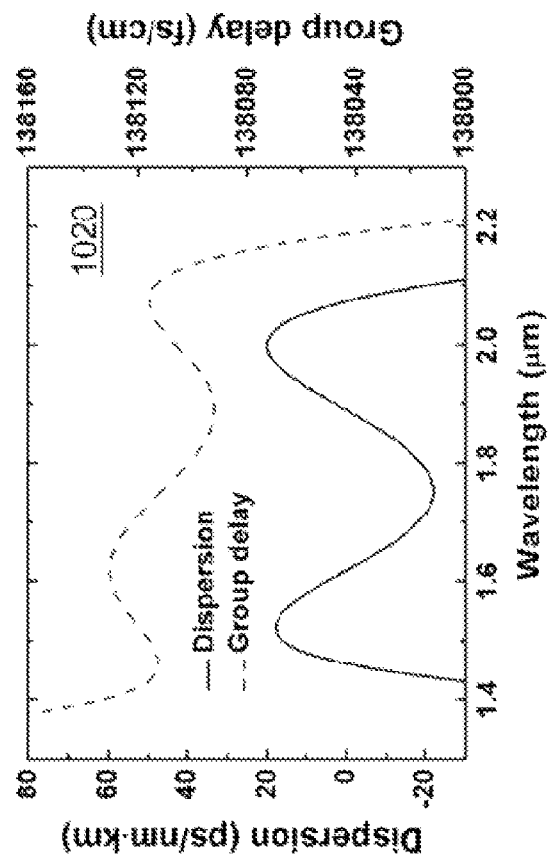
FIGS. 10A-10B, 11A-11B and 12A-12B show a wavelength dependence of dispersion corresponding to examples of waveguides that can be included in the device illustrated in FIG. 9A.
Figure 10A:
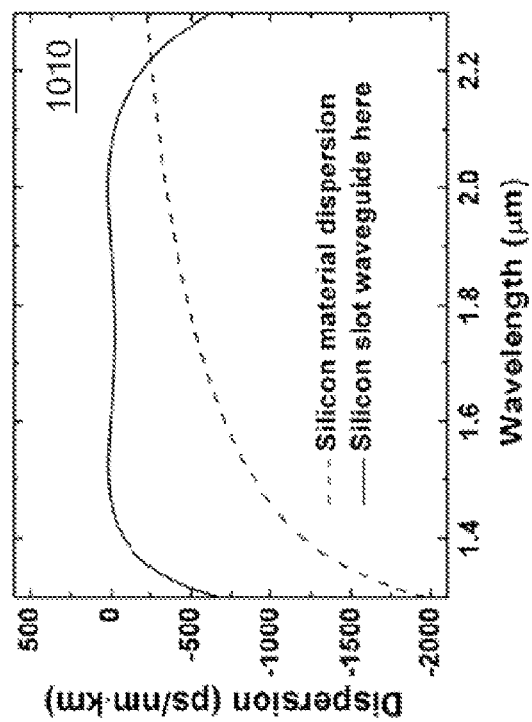

To calculate chromatic dispersion of the waveguide 900 for a quasi-TM mode (vertically polarized), an effective index of refraction as a function of wavelength [34] is obtained, using a full-vector mode solver, COMSOL Multiphysics, with material dispersions of Si and SiO2 taken into account. Algebra used for the dispersion calculation is described in detail in reference [34], which is incorporated by reference herein in its entirety. FIG. 10A is a graph 1010 that shows silicon material dispersion and the flattened dispersion of the quasi-TM mode in the disclosed slot waveguide, calculated as $D=-(c/\lambda)\cdot(d^2 n_{eff}/d\lambda^2)$. Dispersion varies between −22 and +20 ps/(nm·km) over a 667-nm-wide bandwidth, from 1435 to 2102 nm. FIG. 10B is a close-up view 1020 of the graph 1010 near a portion of the dispersion which includes the four ZDWs at 1461, 1618, 1889, and 2074 nm, respectively. The group delay, defined as $\tau=(1/c)\cdot(neff-\lambda\cdot dn_{eff}/d\lambda)$, has a small variation of 40 fs/cm from 1403 to 2146 nm, which produces ultra-broadband group-velocity match for femtosecond pulse interactions.

The idea of generating four ZDWs is based on the following understanding of how to tailor chromatic dispersion of the waveguide 900. Graph 1010 shows that material dispersion in silicon is always negative at wavelengths of interest, and at short wavelengths (close to material bandgap wavelength ~1100 nm), material dispersion is dominant, so overall dispersion is negative. Further, graph 1010 shows that at long wavelengths where the guided mode approaches cut-off, the dispersion is dominated by waveguide dispersion, which is also negative [61]. Therefore, as long as waveguide dimensions are tailored so that, in the middle wavelength range, waveguide dispersion is positive and stronger than material dispersion, a positive overall dispersion can be obtained with two ZDWs [61]. FIGS. 9B-9E show a mode transition, that is, the guided mode evolves from having a strip-mode-like profile 962-1 to having a slot-mode-like profile 962-4, as the wavelength increases. The mode transition causes an anti-crossing effect which in turn induces additional negative waveguide dispersion [34] and thus generates another two ZDWs in the middle of the wavelength range.

In this manner, the silicon guiding layer 920, the SiO2 slot layer 930 and the silicon cladding layer 940 of the waveguide 900 are configured such that a dispersion of the waveguide 900 is normal at shortest and longest wavelengths of a wavelength range (e.g., 1.3-2.3 μm), and increases at the shortest wavelength, and decreases at the longest wavelength. Further, the dispersion is convex from the shortest wavelength to a first wavelength of the wavelength range, is concave from the first wavelength to a second wavelength of the wavelength range, and is convex from the second wavelength to the longest wavelength of the wavelength range.

Figure 11A:
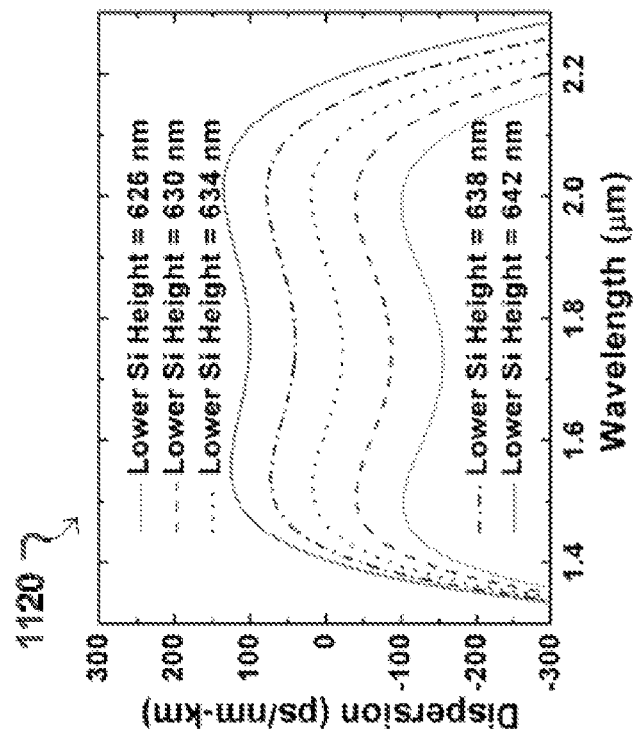

For example, one can change four structural parameters in the waveguide design (cladding layer thickness Hu, guiding layer thickness Hl, slot layer thickness Hs, and waveguide thickness W) around the values given above to tailor dispersion value and slope. FIG. 11A is a graph 1110 that shows the dispersion of the waveguide 900 over a wavelength range for multiple values of the cladding layer thickness. In this case, the dispersion profile is moved from normal to anomalous dispersion regime, with a dispersion value change of 18.5 ps/(nm·km), when the cladding layer thickness individually decreases. For instance, the dispersion can be in normal regime for cladding layer thicknesses larger than a predetermined cladding layer thickness or can be in anomalous regime for cladding layer thicknesses smaller than the predetermined cladding layer thickness. Here, the predetermined cladding layer thickness is 136 nm.

Figure 11B:
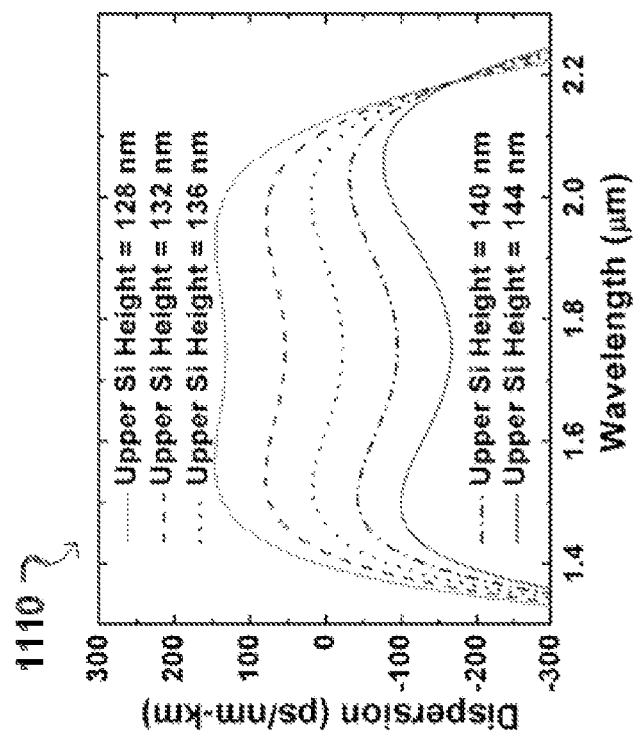

FIG. 11B is a graph 1120 that shows the dispersion of the waveguide 900 over a wavelength range for multiple values of the guiding layer thickness. In this case, the dispersion profile is moved from normal to anomalous dispersion regime, with a dispersion value change of 15.9 ps/(nm·km), when the guiding layer thickness individually increases. For instance, the dispersion can be in normal regime for guiding layer thicknesses smaller than a predetermined guiding layer thickness or can be in anomalous regime for guiding layer thicknesses larger than the predetermined guiding layer thickness. Here, the predetermined guiding layer thickness is 634 nm. No significant change in dispersion slope is observed in graphs 1110 and 1120.

Figure 12B:
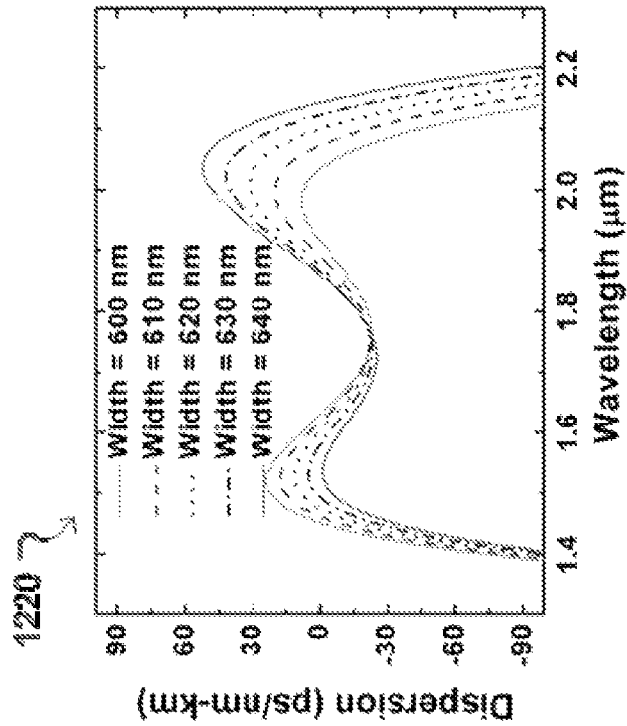
Figure 12A:
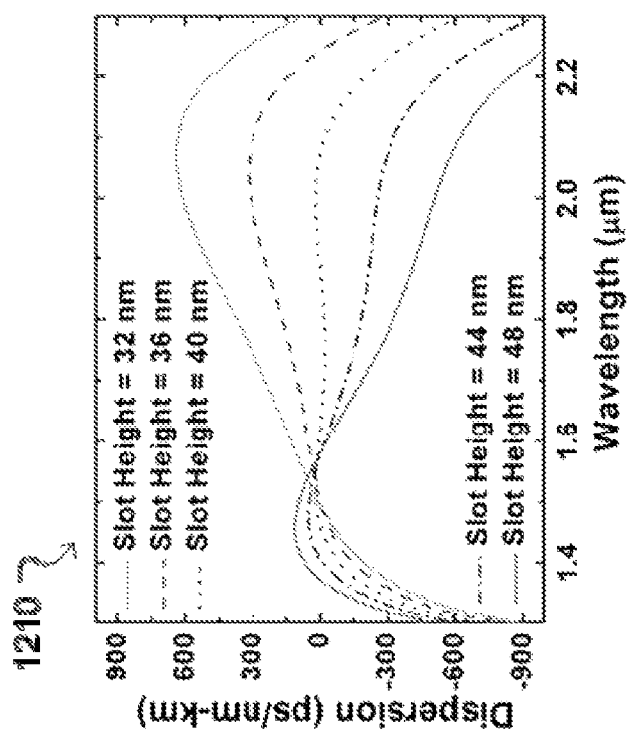

FIG. 12A is a graph 1210 that shows the dispersion of the waveguide 900 over a wavelength range for multiple values of the slot layer thickness. In this case, dispersion slope can be tailored by varying the slot layer thickness from 32 nm to 48 nm. For instance, the dispersion slope can be effectively made positive for slot layer thicknesses smaller than a predetermined slot layer thickness or negative for slot layer thicknesses larger than the predetermined slot layer thickness. Here, the predetermined slot layer thickness is 40 nm. FIG. 12B is a graph 1220 that shows the dispersion of the waveguide 900 over a wavelength range for multiple values of the waveguide thickness. In this case, ZDWs can be moved with a spacing change among them as the waveguide width is increased, which causes a slight rotation of the dispersion profile. Moreover, there are multiple combinations of the structure parameters that can produce a flattened dispersion profile with four ZDWs. For example, simultaneously reducing the cladding layer thickness and decreasing the guiding layer thickness would generate similar dispersion properties as the ones illustrated in graph 1220.

The waveguide 900, which has a flattened dispersion profile with multiple ZDWs described above in connection with FIGS. 10A-10B, 11A-11B and 12A-12B, can be used to generate octave-spanning supercontinua. It is noted that supercontinuum generation in microstructured fiber [7, 8] critically relies on its engineered dispersion profile. In normal dispersion regime, self-phase modulation is mainly responsible for pulse spectral broadening, while higher-order soliton fission and dispersive wave generation are identified to be the main reasons for supercontinuum generation in anomalous dispersion regime [7]. As described above in connection with FIGS. 1-6, self-steepening effects in nonlinear pulse propagation can greatly enhance spectral broadening to produce a two-octave supercontinuum on a chip which includes a silicon nitride waveguide with nearly zero dispersion over a wide wavelength band [64]. To generate a supercontinuum in silicon, the approaches based on self-steepening and self-phase-modulation tend to require very high peak power, which becomes impractical due to TPA in silicon [67]. Moreover, operating in the anomalous dispersion regime, one either used femtosecond pulses to reduce free carrier absorption [23, 24] or moved to middle-infrared wavelengths to mitigate TPA [66].

It is important to point out that tailoring the dispersion profile to produce four ZDWs as described in this specification is substantially different from what was proposed in reference [34], in which three ZDWs were obtained in dispersion-flattening bandwidth, in terms of the ability to broaden pulse spectrum. This is because a dispersion profile with three ZDWs has strong anomalous dispersion at the long-wavelength end of the dispersion-flattening bandwidth, which means that a dispersive wave can hardly be generated at the long-wavelength end [7]. In contrast, being able to tailor the disclosed waveguide dispersion with four ZDWs, one not only achieves flat dispersion over an even wider bandwidth but also, more importantly, produces normal dispersion at both ends of the wavelength band. Assisted by the dispersive wave generation at the both ends, an octave-spanning supercontinuum can be obtained in silicon, in accordance with the disclosed technologies.

To generate the supercontinua described below in reference to FIGS. 13A-13B and 14A-14B, a waveguide 900 having the following waveguide parameters can be used: width W=610 nm, cladding layer thickness Hu=132 nm, guiding layer thickness Hl=344 nm, and slot layer thickness Hs=40 nm. The flattened part of the dispersion profile is intentionally moved into anomalous dispersion regime, as shown in FIG. 11A. Two ZDWs are located at 1418 and 2108 nm. Two local maxima of dispersion are 80 and 79 ps/(nm·km) at 1540 nm and 1965 nm wavelengths, respectively, and a local minimum of dispersion is 53.7 ps/(nm·km) at 1750 nm. We use a generalized nonlinear envelope equation [37, 64] to model supercontinuum generation, with carrier dynamics included [23]. It has been confirmed that the simulation of nonlinear pulse propagations using this envelope equation is quite accurate [37]. Algebra used to model the supercontinuum generation is described in detail in references [64, 72], which are incorporated by reference herein in their entirety. The propagation loss is set to be 7 dB/cm, which may be lower in practice [68], since more light is confined in crystalline silicon guiding layer in this specification. All order dispersion terms are included as shown in reference [23]. In our simulations, the total length of time window is 50 ps, and the whole bandwidth in the frequency domain is 1000 THz.

FIG. 13A shows pulse spectral broadening along the waveguide 900. This broadening is made possible by the flattened dispersion of the waveguide 900 described above in connection with FIGS. 10A-10B, 11A-11B and 12A-12B. A chirp-free hyperbolic secant pulse 1352 is launched into the dispersion-flattened waveguide 900. The input pulse 1352 has a center wavelength at 1810 nm and a full width at half-maximum (FWHM) $T_0$ of 120 fs. Its peak power is 62 W. At this wavelength, a nonlinear index is $n_2$=7.2×10-18 m2/W and a TPA coefficient is $\beta_{TPA}$=5.3×10-12 m/W, based on the measurements in references [69-70]. The nonlinear coefficient of the waveguide is found to be $\gamma$=(102+10.8 j)/(m·W)

using a full-vector model [71]. The shock time $\tau$ equals (1.16+ 0.33 j) fs. At 1810 nm, the second-order dispersion coefficient $\beta_2$=−0.999 ps$^2$/km. Therefore, characteristic dispersion and nonlinearity lengths LD=T0$^2$/|β2|=14.4 cm and LN=1/real(γ)P=0.16 mm, which gives a soliton number of 30.

Further, FIG. 13A shows instances of the supercontinuum corresponding to various pulse propagation distances along the waveguide 900: a first instance of the continuum 1354-1 corresponds to a propagation distance of 2 mm; a second instance of the continuum 1354-2 corresponds to a propagation distance of 2.5 mm; a third instance of the continuum 1354-3 corresponds to a propagation distance of 3 mm; a fourth instance of the continuum 1354-4 corresponds to a propagation distance of 3.5 mm; and a fifth instance of the continuum 1354-5 corresponds to a propagation distance of 4 mm. At the beginning of the propagation, self-phase modulation causes spectral broadening. Due to a relatively low dispersion over a wide band and thus small walk-off of frequency components, the pulse is significantly compressed, which further enhances the spectral broadening. In addition, the pulse transfers energy to high and low spectral components located around 1230 and 2395 nm, where dispersion is normal. This is likely to be dispersive wave generation, since it is shown that group delay matches for 1300, 1810 and 2240 nm by examining the group delay as a function of wavelength. At a propagation distance of 3.5 mm, the supercontinuum 1354-4 spans over more than one octave, at −25 dB level, from 1217 to 2451 nm (or a total spectrum bandwidth of 1234 nm.)

FIG. 13B shows a temporal profile of a contracted pulse 1354 corresponding to the instance of the supercontinuum 1354-4 after the pulse 1352 propagates 3.5 mm through the waveguide 900. At this propagation distance, the compressed pulse 1354 has a FWHM of 12.2 fs. In the pulse waveform, one can see beating patterns at rising and falling edges of the pulse 1354, which correspond to the dispersive waves at long- and short-wavelength ends, respectively.

Figure 14A:
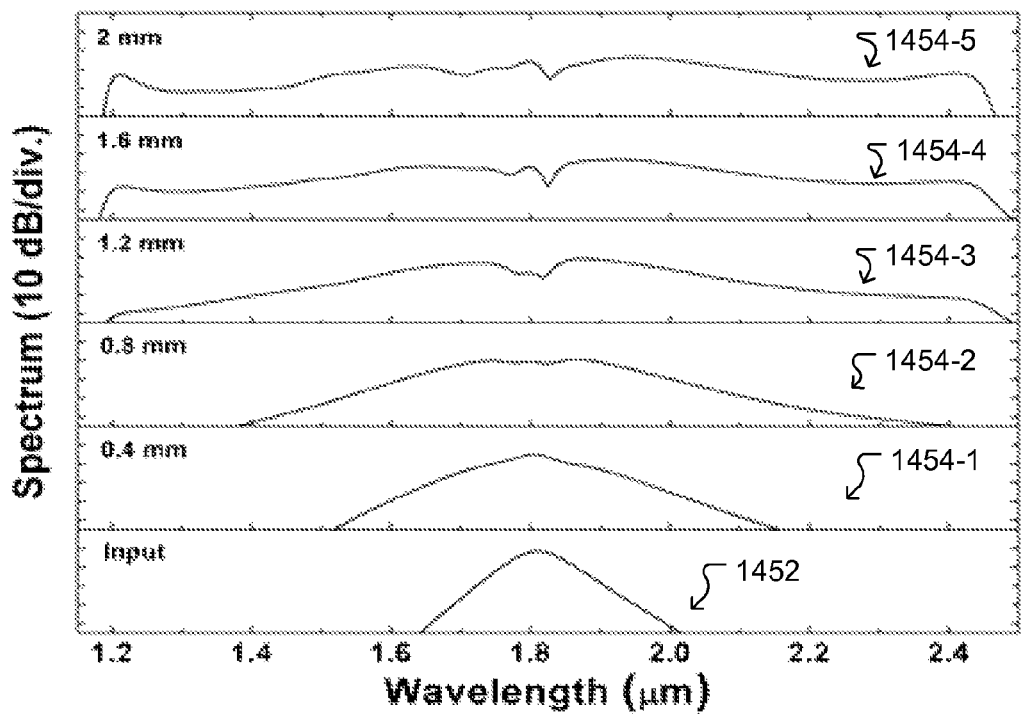
FIGS. 14A-14B show aspects of yet another supercontinuum that can be generated using the device illustrated in FIG. 9A.

FIG. 14A shows supercontinuum generation when a chirp-free hyperbolic secant pulse 1452 is launched into the dispersion-flattened waveguide 900. The input pulse 1452 has a center wavelength at 1810 nm and a full width at half-maximum (FWHM) T$_0$ of 60 fs. Further, FIG. 14A shows instances of the supercontinuum corresponding to various pulse propagation distances along the waveguide 900: a first instance of the continuum 1454-1 corresponds to a propagation distance of 0.4 mm; a second instance of the continuum 1454-2 corresponds to a propagation distance of 0.8 mm; a third instance of the continuum 1454-3 corresponds to a propagation distance of 1.2 mm; a fourth instance of the continuum 1454-4 corresponds to a propagation distance of 1.6 mm; and a fifth instance of the continuum 1454-5 corresponds to a propagation distance of 2 mm. At the beginning of the propagation, self-phase modulation causes spectral broadening. For example, at a propagation distance of 1.6 mm, the supercontinuum 1454-4 spans over more than one octave, at −17 dB level, from 1200 to 2450 nm (or a total spectrum bandwidth of 1250 nm.)

Figure 14B:
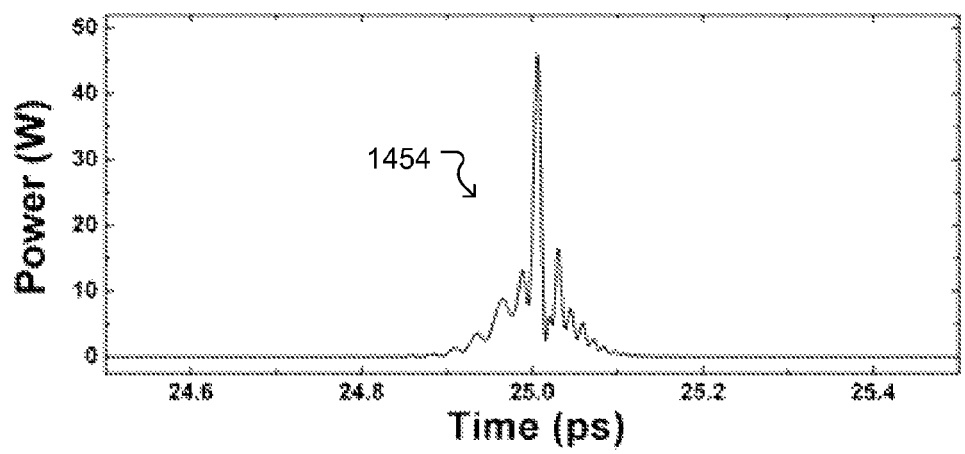

FIG. 14B shows a temporal profile of a contracted pulse 1454 corresponding to the instance of the supercontinuum 1454-4 after the pulse 1452 propagates 1.6 mm through the waveguide 900. At this propagation distance, the compressed pulse 1454 has a FWHM of 10.1 fs. In this process, as no soliton fission is observed, high spectral coherence is preserved.

The disclosed technologies can be used to design a device including a waveguide. The waveguide includes a guiding layer configured and arranged with respect to a substrate to guide light in a strip mode in accordance with a convex dispersion defined for the guiding layer; a cladding layer; and a slot layer arranged between and in contact with the cladding layer and the guiding layer. The slot layer and the cladding layer of the waveguide are configured and arranged with respect to the guiding layer and the substrate, including selection of an index contrast between the slot layer and substrate and the guiding and cladding layers, to (i) transition the light from the strip mode to a slot mode as a wavelength of the light increases within a range and (ii) induce an anti-crossing effect to cause a negative (and concave) waveguide dispersion in balance with the convex dispersion for a portion of the range. In some implementations, a material of the substrate and the slot layer is SiO2, and a material of the guiding layer and the cladding layer is Si3N4. In other implementations, a material of the substrate and the slot layer is SiO2, and a material of the guiding layer and the cladding layer is Si.

When a light pulse having a carrier wavelength and an input pulse width is guided through the waveguide over a propagation distance that exceeds a threshold propagation distance, the device generates light having a continuous spectrum. The carrier wavelength of the light pulse is within or adjacent to a wavelength range of the waveguide dispersion, and a spectral range of the input light pulse corresponding to the input pulse width is narrower than the wavelength range and overlaps at least in part the wavelength range. Further, the continuous spectrum of the generated light is larger than the wavelength range. In some implementations, the device includes, in addition with the waveguide, a chip including telecommunications circuitry coupled with the waveguide.

In conclusion, the disclosed dispersion tailoring technique can be used to improve dispersion flatness by 50 times in integrated high-index-contrast waveguides. Extremely low and flat dispersion is obtained over a wide wavelength range by introducing a nano-scale slot structure, which provides the ability to control light on the femtosecond or even attosecond scale. In some implementations, such slot waveguides which include layers of silicon nitride and SiO$_2$ can generate a two-octave supercontinuum on a chip, which was not shown in the past, by enhancing pulse self-steepening and forming an optical shock as short as 3 fs. Such timing enables single-cycle pulse generation and CEO phase monitoring on an integrated photonics platform. In some implementations, the disclosed dispersion tailoring technique is used to obtain waveguide dispersion with four ZDWs in silicon slot waveguides. The disclosed silicon slot waveguides, which have a flattened dispersion over a 670-nm bandwidth and normal dispersion at both short- and long-wavelength ends of this bandwidth, overcome the limitation on supercontinuum generation imposed by TPA. In this manner, an octave-spanning supercontinuum has been generated in near-infrared wavelength region using the silicon waveguides. On-chip supercontinuum generation is believed to be a key enabler for building portable imaging, sensing, optical coherence tomography, pulse compression, microscopy and spectroscopy, telecommunications, and frequency-metrology-based positioning systems.

With progresses in advanced materials, fabrication and integration technologies, nano-scale engineering of photonic wave guiding structures has been made possible. This allows for tailoring the guidance properties of light such as dispersion, birefringence, and nonlinearity over a large parameter space [49, 50]. Widely controllable dispersion and nonlinearity properties in integrated photonics jointly contribute to the capability of manipulating light on a chip. On-chip light manipulations open the door to combine ultrafast optics and nano-photonics and provide a great opportunity to achieve ubiquitous broadband information acquisition, processing, transfer, and exchange for civil and military applications.

REFERENCES

1. Bloembergen, N., Nonlinear optics: Past, present, and future. IEEE J. Sel. Top. Quantum Electron. 6, 876-880, 2000.
2. J. M. Dudley and J. R. Taylor, Ten years of nonlinear optics in photonic crystal fibre, Nature Photonics 3, 85-90 (2009).
3. T. Brabec and F. Krausz, "Intense few-cycle laser fields: Frontiers of nonlinear optics," Rev. Mod. Phys., vol. 72, pp. 545-591, 2000.
4. Ishikawa, H., Ultrafast all-optical signal processing devices. John Wiley & Sons (2008)
5. R. R. Alfano and S. L. Shapiro, Emission in the region 4000 to 7000 Å via four-photon coupling in glass. Phys. Rev. Lett. 24, 584 (1970).
6. J. K. Ranka, R. S. Windeler, and A. J. Stentz, "Visible continuum generation in air-silica microstructure optical fibers with anomalous dispersion at 800 nm," Opt. Lett. 25, 25-27 (2000).
7. J. M. Dudley, G. Genty, and S. Coen, Supercontinuum generation in photonic crystal fiber. Rev. Mod. Phys. 78, 1135-1184 (2006).
8. D. V. Skryabin and A. V. Gorbach, Colloquium: Looking at a soliton through the prism of optical supercontinuum. Rev. Mod. Phys. 82, 1287-1299 (2010).
9. T. A. Birks, W. J. Wadsworth, and P. St. J. Russell, "Supercontinuum generation in tapered fibers," Opt. Lett. 25, 1415-1417 (2000).
10. G. Qin, X. Yan, C. Kito, M. Liao, C. Chaudhari, T. Suzuki, and Y. Ohishi, "Ultrabroadband supercontinuum generation from ultraviolet to 6.28 μm in a fluoride fiber," Appl. Phys. Lett. 95, 161103 (2009)
11. D. J. Jones, S. A. Diddams, J. K. Ranka, A. Stentz, R. S. Windeler, J. L. Hall, and S. T. Cundiff, Carrier-envelope phase control of femtosecond mode-locked lasers and direct optical frequency synthesis. Science 288, 635 (2000).
12. I. Hartl, X. D. Li, C. Chudoba, R. K. Ghanta, T. H. Ko, J. G. Fujimoto, J. K. Ranka, and R. S. Windeler, "Ultrahigh-resolution optical coherence tomography using continuum generation in an air-silica microstructure optical fiber," Opt. Lett. 26, 608-610 (2001).
13. K. Shi, P. Li, S. Yin, and Z. Liu, "Chromatic confocal microscopy using supercontinuum light," Opt. Express 12, 2096-2101 (2004).
14. H. Takara, T. Ohara, K. Mori, K. Sato, E. Yamada, Y. Inoue, T. Shibata, M. Abe, T. Morioka, and K. I. Sato, "More than 1000 channel optical frequency chain generation from single supercontinuum source with 12.5 GHz channel spacing," Electron. Lett. 36, 2089-2090 (2000).
15. G. Chang, T. B. Norris, and H. G. Winful, Optimization of supercontinuum generation in photonic crystal fibers for pulse compression. Opt. Lett. 28, 546-548 (2003)
16. J. M. Langridge, T. Laurila, R. S. Watt, R. L. Jones, C. F. Kaminski, and J. Hult, "Cavity enhanced absorption spectroscopy of multiple trace gas species using a supercontinuum radiation source," Opt. Express 16, 10178-10188 (2008).
17. W. H. Reeves, D. V. Skryabin, F. Biancalana, J. C. Knight, P. St. J. Russell, F. G. Omenetto, A. Efimov, A. J. Taylor, "Transformation and control of ultra-short pulses in dispersion-engineered photonic crystal fibers," Nature 424, 511-515 (2003).
18. M.-L. V. Tse, P. Horak, F. Poletti, N. G. Broderick, J. H. Price, J. R. Hayes, and D. J. Richardson, Supercontinuum generation at 1.06 μm in holey fibers with dispersion flattened profiles. Opt. Express 14, 4445-4451 (2006)
19. W.-Q. Zhang, S. Afshar V. and T. M. Monro, A genetic algorithm based approach to fiber design for high coherence and large bandwidth supercontinuum generation. Opt. Express 17, 19311-19327 (2009)
20. J. Leuthold, C. Koos and W. Freude, Nonlinear silicon photonics. Nature Photonics 4, 535-544 (2010)
21. M. Pelusi, F. Luan, T. D. Vo, M. R. E. Lamont, S. J. Madden, D. A. Bulla, D.-Y. Choi, B. Luther-Davies and B. J. Eggleton, Photonic-chip-based radio-frequency spectrum analyser with terahertz bandwidth. Nature Photonics 3, 139-143 2009
22. Ö. Boyraz, P. Koonath, V. Raghunathan, and B. Jalali, "All optical switching and continuum generation in silicon waveguides," Opt. Express 12, 4094-4102 (2004)
23. L. Yin, Q. Lin, and G. P. Agrawal, "Soliton fission and supercontinuum generation in silicon waveguides," Opt. Lett. 32, 391-393 (2007)
24. I-W. Hsieh, X. Chen, X. Liu, J. I. Dadap, N. C. Panoiu, C.-Y. Chou, F. Xia, W. M. Green, Y. A. Vlasov, and R. M. Osgood, "Supercontinuum generation in silicon photonic wires," Opt. Express 15, 15242-15249 (2007)
25. M. R. E. Lamont, B. Luther-Davies, D. Y. Choi, S. Madden, and B. J. Eggleton, "Supercontinuum generation in dispersion engineered highly nonlinear ($\gamma=10/W/m$) $As_2S_3$ chalcogenide planar waveguide," Opt. Express 16(19), 14938-14944 (2008)
26. D. Duchesne, M. Peccianti, M. R. E. Lamont, M. Ferrera, L. Razzari, F. Légaré, R. Morandotti, S. Chu, B. E. Little, and D. J. Moss, "Supercontinuum generation in a high index doped silica glass spiral waveguide," Opt. Express 18, 923-930 (2010)
27. L. Yin, Q. Lin, and G. P. Agrawal, "Dispersion tailoring and soliton propagation in silicon waveguides," Opt. Lett. 31, 1295-1297 (2006).
28. E. Dulkeith, F. N. Xia, L. Schares, W. M. J. Green, and Y. A. Vlasov, "Group index and group velocity dispersion in silicon-on-insulator photonic wires," Opt. Express 14, 3853-3863 (2006).
29. A. C. Turner, C. Manolatou, B. S. Schmidt, M. Lipson, M. A. Foster, J. E. Sharping, and A. L. Gaeta, "Tailored anomalous group-velocity dispersion in silicon channel waveguides," Opt. Express 14, 4357-4362 (2006).
30. X. Liu, W. M. J. Green, X. Chen, I-W. Hsieh, J. I. Dadap, Y. A. Vlasov, and R. M. Osgood, Jr., "Conformal dielectric overlayers for engineering dispersion and effective nonlinearity of silicon nanophotonic wires," Opt. Lett. 33, 2889-2891 (2008)
31. M. R. Lamont, C. M. de Sterke, and B. J. Eggleton, "Dispersion engineering of highly nonlinear $As_2S_3$ waveguides for parametric gain and wavelength conversion," Opt. Express 15, 9458-9463 (2007)
32. Z. Zheng, M. Iqbal, and J. Liu, "Dispersion characteristics of SOI-based slot optical waveguides," Opt. Commun. 281, 5151-5155 (2008).
33. D. T. H. Tan, K. Ikeda, P. C. Sun, and Y. Fainman, Group velocity dispersion and self phase modulation in silicon nitride waveguides. Appl. Phys. Lett. 96, 061101 (2010)
34. L. Zhang, Y. Yue, R. G. Beausoleil, and A. E. Willner, "Flattened dispersion in silicon slot waveguides," Opt. Express, vol. 18, no. 19, pp. 20529-20534, September 2010
35. T. G. Eck, Level crossings and anticrossings, Physica, 33, Issue 1, p. 157-162, 1967.

36. A. M. Heidt, Pulse preserving flat-top supercontinuum generation in all-normal dispersion photonic crystal fibers. J. Opt. Soc. Am. B 27, 550-559 (2010)
37. G. Genty, P. Kinsler, B. Kibler, and J. M., "Nonlinear envelope equation modeling of sub-cycle dynamics and harmonic generation in nonlinear waveguides," Opt. Express 15, 5382-5387 (2007)
38. A. L. Gaeta, "Catastrophic collapse of ultrashort pulses," Phys. Rev. Lett. 84, 3582-3585, 2000.
39. P. L. François, "Nonlinear propagation of ultrashort pulses in optical fibers: Total field formulation in the frequency domain," J. Opt. Soc. Am. B 8, 276-293, 1991.
40. G. P. Agrawal, 2001, Nonlinear Fiber Optics, 3rd ed. Academic, San Diego.
41. S. Linden, H. Giessen, and J. Kuhl, "XFROG—A new method for amplitude and phase characterization of weak ultrashort pulses," Phys. Status Solidi B 206, 119-124, 1998.
42. N. Aközbek, A. Iwasaki, A. Becker, M. Scalora, S. L. Chin, and C. M. Bowden, Third-harmonic generation and self-channeling in air using high-power femtosecond laser pulses. Phys. Rev. Lett. 89, 143901 (2002)
43. V. Roppo, M. Centini, C. Sibilia, M. Bertolotti, D. de Ceglia, M. Scalora, N. Akozbek, M. J. Bloemer, J. W. Haus, O. G. Kosareva, and V. P. Kandidov, "Role of phase matching in pulsed second-harmonic generation: Walk-off and phase-locked twin pulses in negative-index media," Phys. Rev. A 76, 033829 (2007).
44. E.-K. Tien, N. S. Yuksek, F. Qian, and O. Boyraz, Pulse compression and modelocking by using TPA in silicon waveguides. Opt. Express 15, 6500-6506 (2007)
45. Q. Lin, T. J. Johnson, C. P. Michael, and O. Painter, Adiabatic self-tuning in a silicon microdisk optical resonator. Opt. Express 16, 14801-14811 (2008)
46. D. T. H. Tan, P. C. Sun and Y. Fainman, Monolithic nonlinear pulse compressor on a silicon chip. Nature Communications 1, 116 (2010)
47. O. D. Mücke, T. Tritschler, M. Wegener, U. Morgner, and F. X. Kärtner, Determining the carrier-envelope offset frequency of 5-fs pulses with extreme nonlinear optics in ZnO. Opt. Lett. 27, 2127 (2002).
48. T. Fuji, J. Rauschenberger, A. Apolonski, V. S. Yakovlev, G. Tempea, T. Udem, C. Gohle, T. W. Hänsch, W. Lehnert, M. Scherer, and F. Krausz, Monolithic carrier-envelope phase-stabilization scheme. Opt. Lett. 30, 332-334 (2005)
49. C. Koos, L. Jacome, C. Poulton, J. Leuthold, and W. Freude, "Nonlinear silicon-on-insulator waveguides for all-optical signal processing," Opt. Express 15, 5976-5990 (2007)
50. A. Karalis, J. D. Joannopoulos, and M. Soljačić, Plasmonic-dielectric systems for high-order dispersionless slow or stopped subwavelength light. Phys. Rev. Lett. 103, 043906 (2009)
51. A. Ferrando, E. Silvestre, J. J. Miret, and P. Andrés, "Nearly zero ultraflattened dispersion in photonic crystal fibers," Opt. Lett. 25, 790-792 (2000).
52. F. Poletti, V. Finazzi, T. M. Monro, N. G. R. Broderick, V. Tse, and D. J. Richardson, "Inverse design and fabrication tolerances of ultra-flattened dispersion holey fibers," Opt. Express 13, 3728-3736 (2005)
53. D. J. J. Hu, P. P. Shum, C. Lu and G. Ren, "Dispersion-flattened polarization-maintaining photonic crystal fiber for nonlinear applications," Opt. Commun., 282(20), 4072-4076 October (2009).
54. H. Xu, J. Wu, K. Xu, Y. Dai, C. Xu, and J. Lin, "Ultra-flattened chromatic dispersion control for circular photonic crystal fibers" J. Opt. A: Pure and Applied Optics 13(5) 055405 (2011).
55. A. V. Yulin, D. V. Skryabin, and P. St. J. Russell, "Four-wave mixing of linear waves and solitons in fibers with higher-order dispersion," Opt. Lett. 29, 2411-2413 (2004)
56. K. Saitoh and M. Koshiba, "Highly nonlinear dispersion-flattened photonic crystal fibers for supercontinuum generation in a telecommunication window," Opt. Express 12, 2027-2032 (2004)
57. M. H. Frosz, P. Falk, and O. Bang, "The role of the second zero-dispersion wavelength in generation of supercontinua and bright-bright soliton-pairs across the zero-dispersion wavelength," Opt. Express 13(16), 6181-6192 (2005) and erratum in 2007.
58. S. P. Stark, F. Biancalana, A. Podlipensky, and P. St. J. Russell, "Nonlinear wavelength conversion in photonic crystal fibers with three zero-dispersion points," Phys. Rev. A 83, 023808 (2011)
59. Q. Lin, O. J. Painter, and G. P. Agrawal, "Nonlinear optical phenomena in silicon waveguides: modeling and applications", Opt. Express 15, 16604-16644 (2007)
60. B. J. Eggleton, B. Luther-Davies & K. Richardson, "Chalcogenide photonics," Nature Photon. 5, 141-148 (2011).
61. L. Zhang, Y. Yue, Y. Xiao-Li, J. Wang, R. G. Beausoleil and A. E. Willner, "Flat and low dispersion in highly nonlinear slot waveguides," Opt. Express 18, 13187-13193 (2010).
62. S. Mas, J. Caraquitena, J. V. Galan, P. Sanchis, and J. Martí, "Tailoring the dispersion behavior of silicon nanophotonic slot waveguides," Opt. Express 18, 20839-20844 (2010)
63. D. D. Hudson, S. A. Dekker, E. C. Mägi, A. C. Judge, S. D. Jackson, E. Li, J. S. Sanghera, L. B. Shaw, I. D. Aggarwal, and B. J. Eggleton, "Octave spanning supercontinuum in an $As_2S_3$ taper using ultralow pump pulse energy," Opt. Lett. 36, 1122-1124 (2011)
64. L. Zhang, Y. Yan, Y. Yue, Q. Lin, O. Painter, R. G. Beausoleil, and A. E. Willner, "On-chip two-octave supercontinuum generation by enhancing self-steepening of optical pulses," Opt. Express 19, 11584-11590 (2011)
65. R. Halir, Y. Okawachi, J. S. Levy, M. A. Foster, M. Lipson, and A. L. Gaeta, "Octave-spanning supercontinuum generation in CMOS-compatible silicon nitride waveguides," in CLEO—Laser Applications to Photonic Applications 2011, paper PDPA6.
66. B. Kuyken, X. Liu, R. M. Osgood, Y. A. Vlasov, R. Baets, G. Roelkens, and W. M. Green, "Generation of a telecom-to-mid-infrared spanning supercontinuum using silicon-on-insulator wire waveguides," in CLEO—Laser Applications to Photonic Applications 2011, paper CTuS1.
67. P. Koonath, D. R. Solli, and B. Jalali, "Limiting nature of continuum generation in silicon," Appl. Phys. Lett. 93, 091114 (2008)
68. R. Sun, P. Dong, N.-N. Feng, C.-Y. Hong, J. Michel, M. Lipson, and L. Kimerling, "Horizontal single and multiple slot waveguides: optical transmission at $\lambda=1550$ nm," Opt. Express 15, 17967-17972 (2007)
69. A. D. Bristow, N. Rotenberg, and H. M. van Driel, "Two-photon absorption and Kerr coefficients of silicon for 850-2200 nm," Appl. Phys. Lett. 90, 191104 (2007).
70. Q. Lin, J. Zhang, G. Piredda, R. W. Boyd, P. M. Fauchet, and G. P. Agrawal, "Dispersion of silicon nonlinearities in the near-infrared region," Appl. Phys. Lett. 90, 021111 (2007).

71. S. Afshar V. and T. M. Monro, "A full vectorial model for pulse propagation in emerging waveguides with subwavelength structures part I: Kerr nonlinearity," Opt. Express 17, 2298-2318 (2009).
72. L. Zhang, Q. Lin, Y. Yue, Y. Yan, R. G. Beausoleil, and A. E. Willner, "Silicon slot waveguide with four zero-dispersion wavelengths and its application in on-chip octave-spanning supercontinuum generation," Opt. Express 20, 1685-1690 (2012)

The invention claimed is:

1. A device comprising:
   a waveguide comprising
   a $SiO_2$ substrate,
   a guiding layer comprising a guiding layer material having a guiding layer index of refraction larger than a $SiO_2$ index of refraction, wherein the guiding layer is disposed on the $SiO_2$ substrate,
   a cladding layer comprising the guiding layer material, and
   a $SiO_2$ slot layer sandwiched between and in contact with the guiding and cladding layers,
   wherein the guiding layer, the $SiO_2$ slot layer and the cladding layer of the waveguide are configured such that a dispersion of the waveguide
   is normal at shortest and longest wavelengths of a wavelength range, increases at the shortest wavelength, and decreases at the longest wavelength,
   is convex from the shortest wavelength to a first wavelength of the wavelength range,
   is concave from the first wavelength to a second wavelength of the wavelength range, and
   is convex from the second wavelength to the longest wavelength of the wavelength range.

2. The device of claim 1, wherein the dispersion of the waveguide has two local maxima and a local minimum over the wavelength range, such that a wavelength corresponding to the local minimum is between respective wavelengths corresponding to the local maxima.

3. The device of claim 2, wherein the dispersion of the waveguide has zero values at four wavelengths within the wavelength range.

4. The device of claim 1, wherein
   the guiding layer material is Si,
   the wavelength range is from 1435 nm to 2102 nm, and
   the dispersion of the waveguide varies between −22 to +20 ps/(nm*km) over the wavelength range.

5. The device of claim 1, wherein
   the guiding layer material is $Si_3N_4$,
   the wavelength range is from 1295 nm to 1803 nm, and
   the dispersion of the waveguide varies between −0.20 to +0.35 ps/(nm*km) over the wavelength range.

6. The device of claim 1, wherein an average value of the dispersion of the waveguide is
   negative, which corresponds to normal dispersion, when a thickness of the cladding layer exceeds a predetermined cladding layer thickness, and
   positive, which corresponds to anomalous dispersion, when the thickness of the cladding layer is less than the predetermined cladding layer thickness.

7. The device of claim 1, wherein an average value of the dispersion of the waveguide is
   negative, which corresponds to normal dispersion, when a thickness of the guiding layer is less than a predetermined guiding layer thickness, and
   positive, which corresponds to anomalous dispersion, when the thickness of the guiding layer exceeds the predetermined guiding layer thickness.

8. The device of claim 1, wherein an average slope value of the dispersion of the waveguide is
   negative when a thickness of the slot layer exceeds a predetermined slot layer thickness, and
   positive when the thickness of the slot layer is less than the predetermined slot layer thickness.

9. The device of claim 1, wherein
   when a light pulse having a carrier wavelength and an input pulse width is guided through the waveguide over a propagation distance that exceeds a threshold propagation distance, the device generates light having a continuous spectrum,
   the carrier wavelength of the light pulse is within or adjacent to the wavelength range, and a spectral range of the input light pulse corresponding to the input pulse width is narrower than the wavelength range and overlaps at least in part the wavelength range, and
   the continuous spectrum of the generated light is larger than the wavelength range.

10. The device of claim 9, wherein
    the guiding layer material is Si, and the dispersion of the waveguide varies between −22 to +20 ps/(nm*km) over the wavelength range from 1435 nm to 2102 nm,
    the carrier wavelength of the input light pulse is 1800 nm and the full-width-at-half-max of the input light pulse is 120 fs,
    the threshold propagation distance is between 3-4 mm, and
    the continuous spectrum of the generated light spans from 1217 nm to 2451 nm, at −25 dB level.

11. The device of claim 9, wherein
    the guiding layer material is $Si_3N_4$, and the dispersion of the waveguide varies between −0.20 to +0.35 ps/(nm*km) over the wavelength range from 1295 nm to 1803 nm,
    the carrier wavelength of the input light pulse is 2200 nm and the full-width-at-half-max of the input light pulse is 120 fs,
    the threshold propagation distance is between 5-10 mm, and
    the continuous spectrum of the generated light spans from 630 nm to 2650 nm, at −35 dB level.

12. The device of claim 9, comprising
    a flat-top wide-band filter centered on a filter wavelength and having a filter spectral width, the filter wavelength and the filter spectral width configured to overlap the continuous spectrum of the generated light, such that the flat-top wide-band filter removes a long wavelength portion and a short wavelength portion from the continuous spectrum of the generated light to obtain filtered light,
    wherein the device outputs the filtered light as an output light pulse having an output carrier wavelength corresponding to the filter wavelength and an output pulse width corresponding to the filter spectral width, such that the output pulse width is shorter than the input pulse width by a ratio of the spectral range of the input pulse to the filter spectral width.

13. The device of claim 12, wherein
    the threshold propagation distance is 5 mm, and
    the input pulse width is 120 fs, and the output pulse width is 5 fs.

14. The device of claim 9, comprising
    a beam splitter to split a fraction of the generated light having the continuous spectrum into first probe light and second probe light;
    a first narrow-band filter centered on a first filter wavelength to pass a first portion of the continuous spectrum of the first probe light at the first filter wavelength;

a second narrow-band filter centered on a second filter wavelength to pass a second portion of the continuous spectrum of the second probe light at the second filter wavelength;

a first photo-detector to measure a first power value of the first portion of the continuous spectrum of the first probe light at the first filter wavelength passed by the first narrow-band filter for a current value of an carrier-envelope offset (CEO) phase of the input pulse;

a second photo-detector to measure a second power value of the second portion of the continuous spectrum of the second probe light at the second filter wavelength passed by the second narrow-band filter for the current value of the CEO phase of the input pulse; and a phase adjustor to controllably increment the CEO phase of the input pulse.

15. The device of claim 14, wherein the device is a system-on-chip (SoC), and the SoC comprises a processing device to estimate an absolute CEO phase of the input pulse based on multiple first and second power values measured for successive increments of the CEO phase of the input pulse.

16. The device of claim 1, comprising a chip comprising telecommunications circuitry coupled with the waveguide.

17. The device of claim 1, wherein a mode of light, which is guided through the waveguide, transitions from a strip mode to a slot mode as wavelength of the guided light increases within the wavelength range.

\* \* \* \* \*